(12) United States Patent
Takahasi et al.

(10) Patent No.: US 8,782,660 B2
(45) Date of Patent: Jul. 15, 2014

(54) COMPUTING SYSTEM AND JOB ALLOCATION METHOD

(75) Inventors: Kouitirou Takahasi, Kawasaki (JP); Kouzo Inada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 13/214,363

(22) Filed: Aug. 22, 2011

(65) Prior Publication Data

US 2012/0079496 A1    Mar. 29, 2012

(30) Foreign Application Priority Data

Sep. 28, 2010   (JP) ................................. 2010-217580

(51) Int. Cl.
*G06F 9/46* (2006.01)

(52) U.S. Cl.
USPC ......................................................... 718/104

(58) Field of Classification Search
USPC .......................................................... 718/104
See application file for complete search history.

(56) References Cited

U.S. PATENT DOCUMENTS

| | | | | |
|---|---|---|---|---|
| 6,006,248 | A * | 12/1999 | Nagae ............................ | 718/105 |
| 6,993,762 | B1 * | 1/2006 | Pierre ............................ | 718/102 |
| 2009/0235263 | A1 | 9/2009 | Furukawa | |
| 2009/0259345 | A1 | 10/2009 | Kato et al. | |
| 2010/0146515 | A1 * | 6/2010 | Shpigelman ................... | 718/104 |

FOREIGN PATENT DOCUMENTS

| | | |
|---|---|---|
| JP | 2004-126968 | 4/2004 |
| JP | 2004-240669 | 8/2004 |
| JP | 2008-117145 | 5/2008 |
| JP | 2008-242614 | 10/2008 |
| JP | 2009-223637 | 10/2009 |
| JP | 2009-252056 | 10/2009 |
| JP | 2009-277022 | 11/2009 |

OTHER PUBLICATIONS

Office Action issued by the Japanese Patent Office on Mar. 4, 2014 in the corresponding Japanese patent application No. 2010-217580.

* cited by examiner

*Primary Examiner* — Emerson Puente
*Assistant Examiner* — Steven Do
(74) *Attorney, Agent, or Firm* — Staas & Halsey LLP

(57) ABSTRACT

A computing system includes a plurality of computing apparatuses, a job allocation information storage unit, a position information storage unit, and a job allocation unit. The job allocation information storage stores job allocation information indicating job allocation status of each of the plurality of computing apparatuses. The job allocation status is one of in an active state and in an inactive state. The position information storage unit stores position information indicating relative positions of the plurality of computing apparatuses. The job allocation unit refers to the job allocation information and the position information, selects a candidate inactive computing apparatus on the basis of a distance between each pair of an inactive computing apparatus and an active computing apparatus, and allocates a job to the candidate inactive computing apparatus.

14 Claims, 20 Drawing Sheets

DATA STORAGE UNIT 52

| APPARATUS NAME (92) | COORDINATE (94) |
| --- | --- |
| | X AXIS (96) |
| A | 3 |
| B | 5 |
| C | 7 |
| D | 9 |
| ... | ... |
| Xn | |

DATA STORAGE UNIT — 52

90B

| APPARATUS NAME | COORDINATE | |
|---|---|---|
| | X AXIS | Y AXIS |
| A | 3 | 3 |
| B | 5 | 3 |
| C | 7 | 5 |
| D | 9 | 5 |
| ... | ... | ... |
| Xn | | |

DATA STORAGE UNIT 52

90C

| APPARATUS NAME (92) | COORDINATE (94) | | |
|---|---|---|---|
| | X AXIS (96) | Y AXIS (102) | Z AXIS (104) |
| A | 3 | 3 | 3 |
| B | 5 | 3 | 3 |
| C | 7 | 5 | 3 |
| D | 9 | 5 | 5 |
| ... | ... | ... | ... |
| Xn | | | |

| APPARATUS NAME: x | TOTAL USAGE TIME: h(x) |
|---|---|
| A | 30 |
| B | 55 |
| C | 98 |
| D | 74 |
| ... | ... |
| Xn | |

DATA STORAGE UNIT

US 8,782,660 B2

COMPUTING SYSTEM AND JOB ALLOCATION METHOD

CROSS-REFERENCE TO RELATED APPLICATION

This application is based upon and claims the benefit of priority of the prior Japanese Patent Application No. 2010-217580, filed on Sep. 28, 2010, the entire contents of which are incorporated herein by reference.

FIELD

The embodiments discussed herein are related to a job distribution technology for a computing system provided with a large number of computing apparatuses in an environment such as a computer room, and for example, related to a computing system in which exhaust heat from the respective computing apparatuses is equalized, and a job allocation method thereof.

BACKGROUND

A large number of computing apparatuses connected with network communication cables are used in a high performance computing, and an analytical computation in a parallel distributed processing by a plurality of computing apparatuses and a simulation computation by a plurality of computing apparatuses may be executed. For a large scale computing, a large number of computing apparatuses are required, and also, high performance computing apparatuses are needed.

A job control program is used for a control on jobs carried out by a large number of computing apparatuses. In the job control, a job is stored in a job queue, a necessary number of computing apparatuses for performing the job are secured, and the job is input from the job queue to the secured computing apparatuses. For the above-mentioned job control program, for example, an LSF provided by Platform Computing Corporation, a Network Queuing System (NQS) developed by Sterling Software Inc, and the like are proposed.

Also, it is proposed that a maximum temperature in a processing system provided with a plurality of processors is predicted on the basis of a detected temperature and stored information, for a plurality of deployment patterns indicating task allocations with respect to the plurality of processors, and a preferable task allocation to the processors is carried out.

With regard to job allocations to a plurality of computers, it is proposed that a temperature prediction based on a predicted value of power consumption and a heating value for the job allocations is carried out, and computers to which the job is allocated are decided on the basis of the result of the temperature prediction. Also, it is proposed that a temperature information management table is provided, a reference is made to the temperature information management table, a computer having a lowest temperature is searched for, and a job is allocated to the computer.

With regard to job allocation to a plurality of computing nodes, it is proposed that a value for determination is calculated for each inactive computing node on the basis of a power saving mode transition rate thereof and an average value of distances from communication targets thereto, and the job is allocated to an inactive computing node having the largest value for determination.

Related techniques are disclosed in Japanese Laid-open Patent Publication No. 2009-277022, Japanese Laid-open Patent Publication No. 2008-242614, Japanese Laid-open Patent Publication No. 2004-126968, and Japanese Laid-open Patent Publication No. 2009-223637.

SUMMARY

According to an aspect of the present invention, provided is a computing system including a plurality of computing apparatuses, a job allocation information storage unit, a position information storage unit, and a job allocation unit. The job allocation information storage stores job allocation information indicating job allocation status of each of the plurality of computing apparatuses. The job allocation status is one of in an active state and in an inactive state. The position information storage unit stores position information indicating relative positions of the plurality of computing apparatuses. The job allocation unit refers to the job allocation information and the position information, selects a candidate inactive computing apparatus on the basis of a distance between each pair of an inactive computing apparatus and an active computing apparatus, and allocates a job to the candidate inactive computing apparatus.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 8 is a diagram illustrating an exemplary data format of a position correspondence table according to an embodiment of the present invention;

FIG. 13 is a diagram illustrating an exemplary data format of a position correspondence table according to an embodiment of the present invention;

FIG. 16 is a diagram illustrating an exemplary data format of a position correspondence table according to an embodiment of the present invention;

FIG. 17 is a diagram illustrating an exemplary data format of a usage time table according to an embodiment of the present invention;

DESCRIPTION OF EMBODIMENTS

Figure 1:
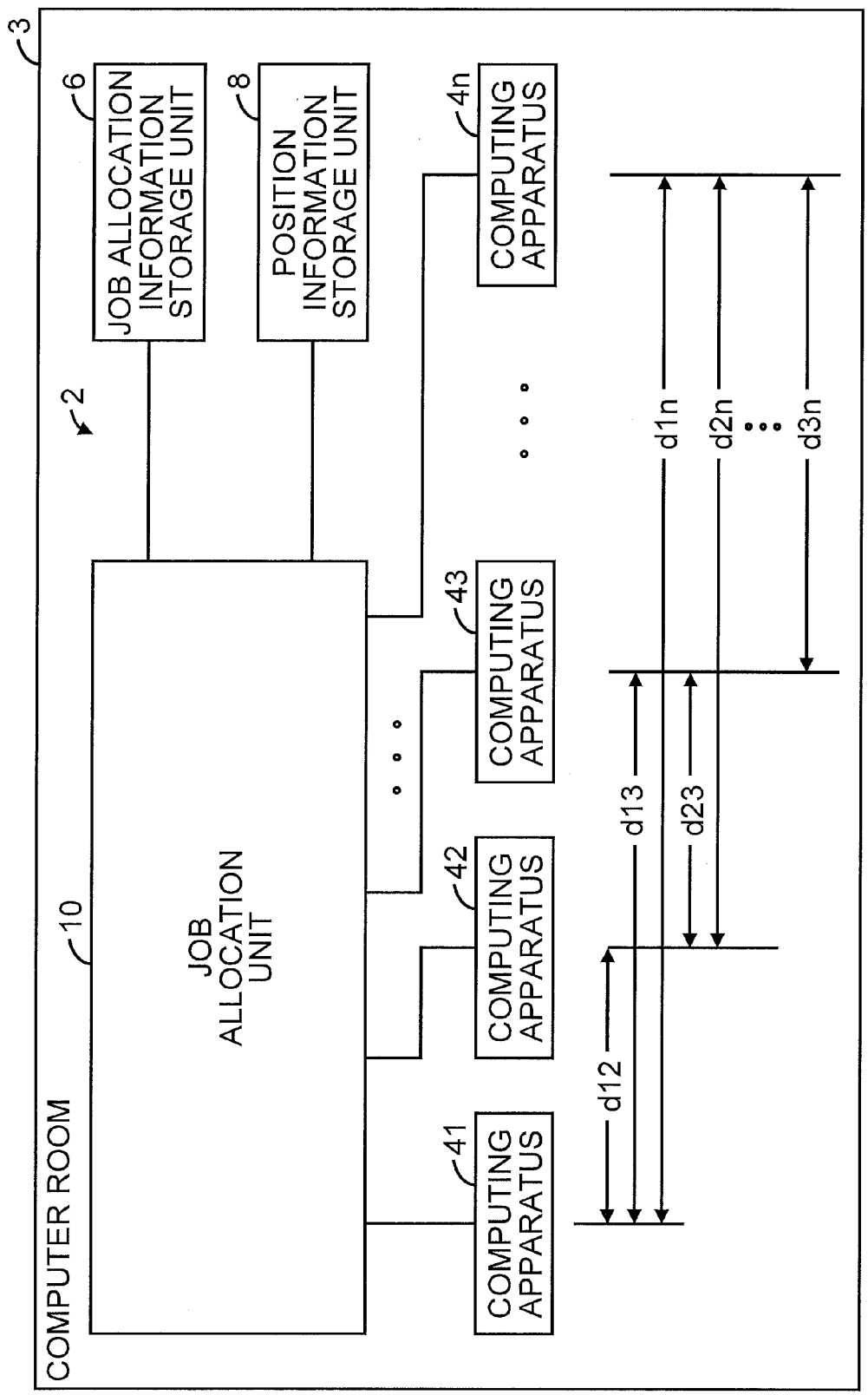
FIG. 1 is a diagram illustrating an exemplary computing system according to an embodiment of the present invention.

In an environment such as a computer room in which a computing system provided with a large number of computing apparatuses is installed, the large number of computing apparatuses are installed in shelves and racks, the computing apparatuses are deployed in a mode such as a line deployment along the X axis or the Y axis, a two-dimensional deployment in directions of the X axis and the Y axis, or a three-dimensional deployment in directions of the X axis, the Y axis, and the Z axis.

A higher performance is realized in the computing apparatuses, and furthermore, an advanced computing is executed. The higher performance of the computing apparatuses or the sophistication of the computing causes a higher temperature in the respective computing apparatuses that execute a job. Each computing apparatus is provided with a fan, intakes air from an outside of the apparatus due to the rotation of the fan, and discharges heat in the apparatus with exhaust air to the outside of the apparatus.

In the computing apparatuses having the higher performance, an exothermic temperature at the time of the job execution is high, and accordingly an exhaust temperature becomes high. When the jobs are input in a deployment order of the computing apparatuses, in a case where the execution of jobs are concentrated, a concentration or bias of the exhaust heat occurs.

In an environment where a plurality of air conditioners exist, in a case where the bias of the exhaust heat from the plurality of computing apparatuses does not exist, no difference exists in a total power usage by the plurality of air conditioners between a case of uniform outputs of the respective air conditioners and a case of biased outputs of the respective air conditioners. However, in a case where the bias of the exhaust heat from the plurality of computing apparatuses exists within a cooling scope of a certain air conditioner, the outputs of the air conditioner is adjusted to the highest exhaust heat temperature. In this case, the bias of the exhaust heat leads to an increase in the power usage.

The above-mentioned demand or problem has not been discussed and configurations or the like for solving the problem has not been provided.

In view of the above, it is preferable to provide a computing system and a job allocation method that may distribute jobs with respect to a plurality of computing apparatuses.

According to the embodiments, any one of the following effects may be obtained.

(1) In the environment where a large number of computing apparatuses are installed, jobs may be distributed with respect to the computing apparatuses.

(2) Due to the job distribution, the bias of the exhaust heat emitted from the computing apparatuses may be prevented, and it is possible to equalize the exhaust heat from the respective computing apparatuses.

(3) As the exhaust heat from the respective computing apparatuses may be equalized, the bias of the outputs from the plurality of air conditioners for cooling the environment where the large number of computing apparatuses are prevented, thus saving the power usage.

Then, further purposes, features, and advantages of the embodiments will become more apparent with reference to the attached drawings and respective exemplary embodiments.

First Embodiment

A first embodiment will be discussed with reference to FIG. 1. FIG. 1 illustrates an exemplary computing system according to the present embodiment. A configuration illustrated in FIG. 1 is an example, and the present embodiment is not limited to the configuration illustrated in FIG. 1.

The computing system 2 is an example of a computing system installed in a computer room 3, and includes a large number of computing apparatuses 41, 42, 43 . . . 4n.

The computer room 3 is an example of an environment where the large number of computing apparatuses 41, 42, 43 . . . 4n are collectively deployed and is a space cooled by a single or a plurality of air conditioners. The number of the computing apparatuses 41, 42, 43 . . . 4n to be deployed may be two or more in which a job distribution may be realized.

A job allocation information storage unit 6 stores job allocation information indicating job allocation status with respect to the respective computing apparatuses 41, 42, 43 . . . 4n. The job allocation information may include information indicating current job allocation status and a past job allocation history. The job allocation information may include usage time information.

A position information storage unit 8 stores position information indicating relative positions of the plurality of computing apparatuses 41, 42, 43 . . . 4n. For example, with respect to the computing apparatus 41, the position information includes a distance d12 between the computing apparatuses 41 and 42, a distance d13 between the computing apparatuses 41 and 43, . . . a distance din between the computing apparatuses 41 and 4n. With respect to the computing apparatus 42, the position information includes a distance d23 between the computing apparatuses 42 and 43, . . . a distance d2n between the computing apparatuses 42 and 4n. With respect to the computing apparatus 43, the position information includes a distance d3n between the computing apparatuses 43 and 4n. These distances may be obtained from the respective positions on the X-coordinate, the Y-coordinate, and the Z-coordinate of the computer room 3 where the computing apparatuses 41, 42, 43 . . . 4n are installed.

A job allocation unit 10 includes a processor or the like. When a job is allocated to a computing apparatus (referred to as an inactive computing apparatus) in a rest condition, i.e. not executing a job, the job allocation unit 10 allocates the job to an inactive computing apparatus (among the computing apparatuses 41, 42, 43 . . . 4n) which is farthest from the computing apparatuses (referred to as an active computing apparatus) currently executing a job (among the computing apparatuses 41, 42, 43 . . . 4n). At the time of the job allocation, the job allocation information and the position information are referred to. As discussed above, the job allocation information is stored and managed in the job allocation information storage unit 6, and the position information is stored and managed in the position information storage unit 8.

Figure 2:
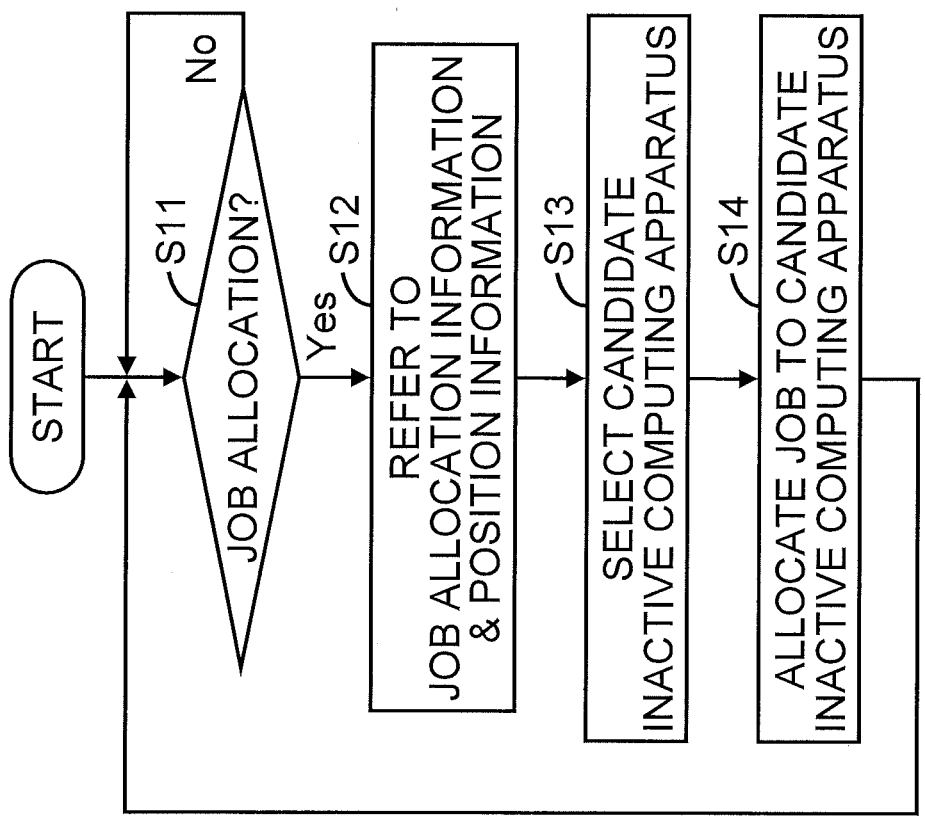
FIG. 2 is a diagram illustrating an exemplary operation flow of job allocation according to an embodiment of the present invention.

The job allocation will be discussed with reference to FIG. 2. FIG. 2 illustrates an exemplary operation flow of the job allocation according to the present embodiment. The operation flow illustrated in FIG. 2 is an example, and the present embodiment is not limited to the operation flow illustrated in FIG. 2.

In S11, a new job is provided to the computing system 2 currently executing a job. The job allocation unit 10 determines whether or not this is a job allocation.

In S12, when this is a job allocation ("Yes" in S11), the job allocation unit 10 refers to the job allocation information and the position information. The job allocation information is read out from the job allocation information storage unit 6, and the position information is read out from the position information storage unit 8.

In S13, at the time of the job allocation, the job allocation unit 10 selects a candidate inactive computing apparatus that is farthest from the active computing apparatuses on the basis of the job allocation information and the position information.

In S14, the job allocation unit 10 allocates the new job to the candidate inactive computing apparatus, and the candidate inactive computing apparatus executes the new job.

For example, in FIG. 1, when execution of a new job is instructed in a case where the computing apparatuses 43 . . . 4n are active (executing a job), one of the inactive computing apparatuses 41 and 42 may be selected for execution of the new job. The job allocation unit 10 refers to the job allocation information and learns that the computing apparatuses 41 and 42 are inactive (not executing a job) and the computing apparatuses 43 . . . 4n are active. The job allocation unit 10 refers to the position information to learn distances between each of the inactive computing apparatuses 41 and 42 and each of the active computing apparatuses 43 . . . 4n. For example, the job allocation unit 10 refers to the distances d23 and d13 of the inactive computing apparatuses 41 and 42 from the active computing apparatus 43. In this case, as the distances have a relation of d23<d13, among the inactive computing apparatuses 41 and 42, the inactive computing apparatus 41 having the distance d13 from the active computing apparatus 43 is farthest from the active computing apparatus 43. Similarly, the inactive computing apparatus 41 is farthest from each of other active computing apparatuses. Therefore, the job allocation unit 10 allocates the new job to the computing apparatus 41.

Figure 3A:
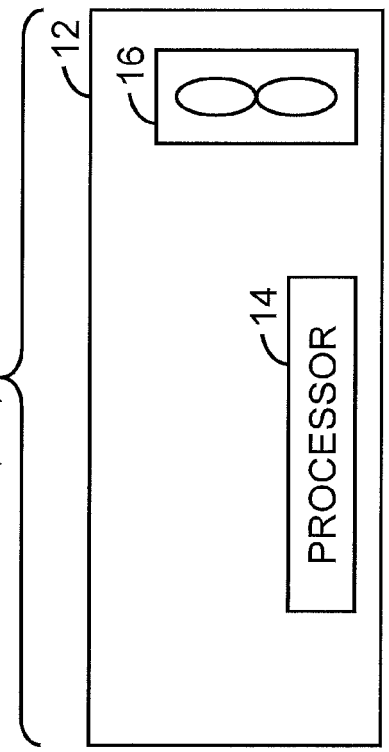
FIG. 3A is a diagram illustrating an exemplary configuration of a computing apparatus according to an embodiment of the present invention.
Figure 3B:
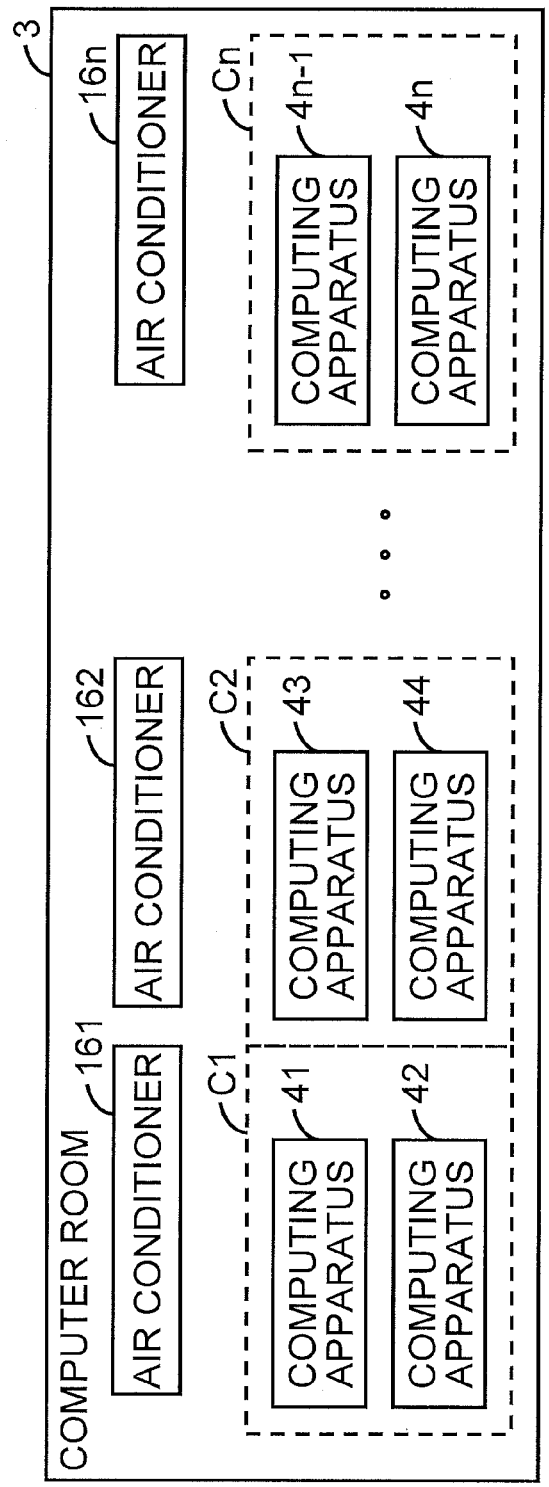
FIG. 3B is a diagram illustrating an exemplary deployment of air conditioners in a computer room according to an embodiment of the present invention.

The equalization of the exhaust heat will be discussed with reference to FIGS. 3A and 3B. FIGS. 3A and 3B illustrate exhaust of a computing apparatus and cooling scopes of air conditioners. FIG. 3A illustrates an exemplary configuration of a computing apparatus and FIG. 3B illustrates an exemplary deployment of air conditioners in a computer room. The exhaust and cooling scopes illustrated in FIGS. 3A and 3B are examples, and the present embodiment is not limited to the configurations illustrated in FIGS. 3A and 3B.

As illustrated in FIG. 3A, the respective computing apparatuses 41, 42, 43 . . . 4n, include for example, an apparatus casing 12, a processor 14 inside the apparatus casing 12, and an exhaust fan 16 on a back face side of the apparatus casing 12. The processor 14 is, for example, a central processing unit (CPU) which is a heat source during executing a job. The exhaust fan 16 is driven during executing a job to inhale air W1 in the computer room 3 from a front face side of the apparatus casing 12 and exhale exhaust heat W2 in the apparatus casing 12 into the computer room 3.

As illustrated in FIG. 3B, a plurality of air conditioners 161, 162 . . . 16n are deployed in the computer room 3 to cool the room air. Cooling scopes of the air conditioners 161, 162 . . . 16n are supposed to be C1, C2 . . . Cn, respectively. In the example in FIG. 3B, the computing apparatuses 41 and 42 are installed in the cooling scope C1, the computing apparatuses 43 and 44 are installed in the cooling scope C2, and the computing apparatuses 4n−1 and 4n are installed in the cooling scope Cn.

In the above-mentioned job allocation, as the computing apparatuses 41 and 42 in the cooling scope C1 are inactive, an output of the air conditioner 161 dealing with the cooling scope C1 is wasteful before the allocation of the new job. However, the new job is allocated to the computing apparatus 41, and the output of the air conditioner 161 in the cooling scope C1 is utilized. According to this, the equalization of the exhaust heat may be realized, and the outputs of the air conditioners 161, 162 . . . 16n may be equalized.

According to the above-mentioned configuration, the following advantages and effects are obtained.

(1) In an environment, e.g., the computer room 3, where a large number of computing apparatuses 41, 42, 43 . . . 4n are installed, the job allocation information and the position information are referred to, and the jobs are distributed to the large number of computing apparatuses 41, 42, 43 . . . 4n.

(2) In an environment, e.g., the computer room 3, where a large number of computing apparatuses 41, 42, 43 . . . 4n are installed, the bias of the exhaust heat of the computing apparatuses 41, 42, 43 . . . 4n may be prevented, and the equalization of the exhaust heat may be realized.

(3) The bias or concentration of the exhaust heat may be avoided, the heat distribution of the computing apparatuses 41, 42, 43 . . . 4n may be equalized, and a high temperature or overheat state of a particular computing apparatus due to the concentration or bias of the exhaust heat may be avoided.

(4) In an environment, e.g., the computer room 3, where a large number of computing apparatuses 41, 42, 43 . . . 4n are installed, the bias of the outputs of the air conditioners for cooling the environment may be prevented, the power usage may be saved.

Second Embodiment

Figure 4:
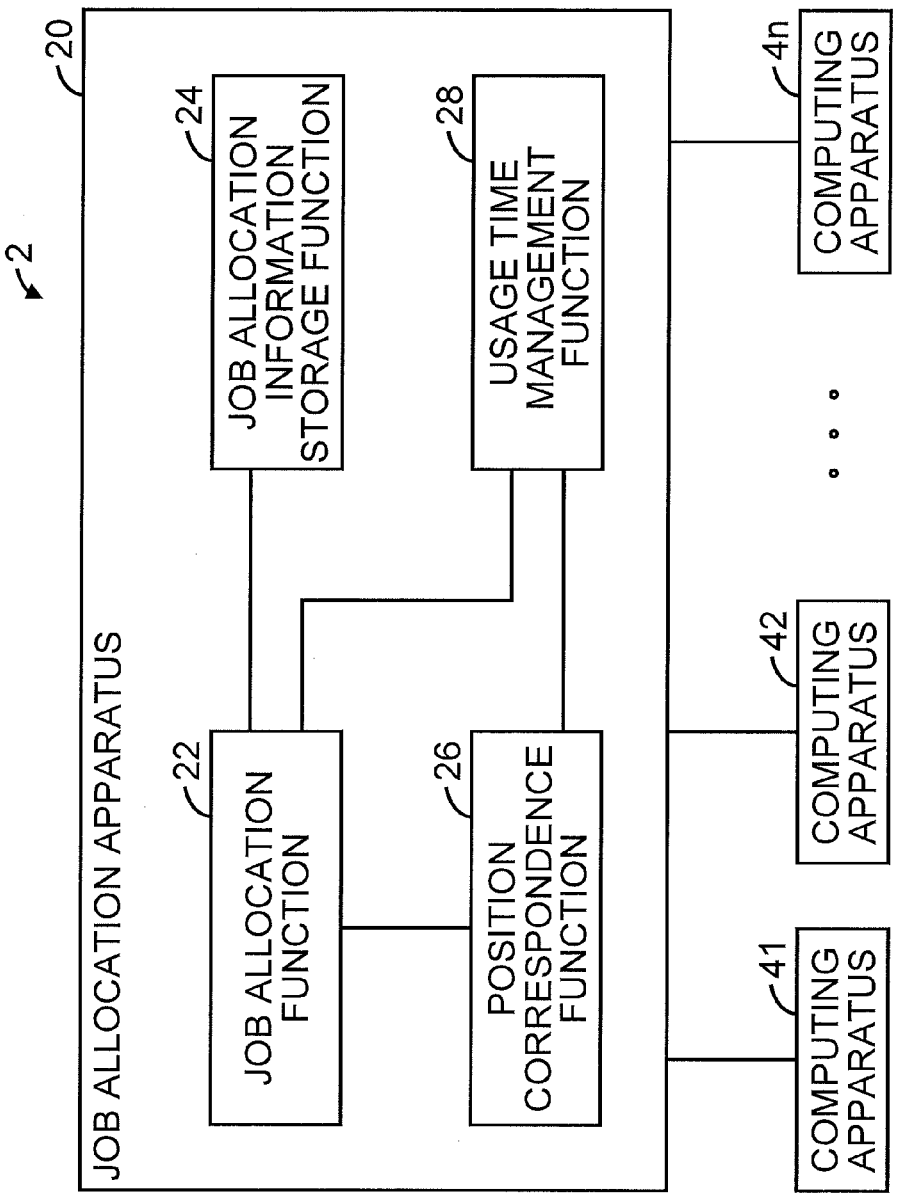
FIG. 4 is a diagram illustrating an exemplary computing system according to an embodiment of the present invention.

A second embodiment will be discussed with reference to FIG. 4. FIG. 4 illustrates an exemplary computing system according to the present embodiment. A configuration illustrated in FIG. 4 is an example, and the present embodiment is not limited to the configuration illustrated in FIG. 4. In FIG. 4, like components as those in FIG. 1, FIG. 3A and FIG. 3B are assigned with like reference symbols.

As illustrated in FIG. 4, the computing system 2 according to the present embodiment includes a job allocation apparatus 20. The job allocation apparatus 20 distributes the job allocations with respect to the large number of computing apparatuses 41, 42 . . . 4n installed in the computer room 3 to avoid the bias of the exhaust heat. FIG. 4 illustrates an exemplary one-dimensional deployment (one-line deployment), that is, it is supposed that the computing apparatuses 41, 42 ... 4n are deployed in the X axis direction or the Y axis direction in the present embodiment.

The job allocation apparatus 20 performs a job allocation function 22, a job allocation information storage function 24, a position correspondence function 26, a usage time management function 28, and the like.

The job allocation function 22 is a function of allocating a job to the computing apparatuses 41, 42 ... 4n. Specifically, the job allocation apparatus 20 selects an inactive computing apparatus which is farthest from active computing apparatuses and allocates the job to the selected inactive computing apparatus. To learn the distances, the job allocation apparatus 20 refers to position information managed by performing the position correspondence function 26. The job allocation apparatus 20 may refer to usage times of the computing apparatuses 41, 42 ... 4n which are managed by performing the usage time management function 28. Specifically, the job allocation apparatus 20 may allocate the job to an inactive computing apparatus having little usage time, avoiding an inactive computing apparatus having much usage time.

The job allocation information storage function 24 is a function of storing information indicating a job allocation status of the respective computing apparatuses 41, 42 ... 4n, that is, which computing apparatus is currently executing a job. The job allocation apparatus 20 may store a history of the past job allocations with regard to the respective computing apparatuses 41, 42 ... 4n.

The position correspondence function 26 is a function of recording information indicating positions of the computing apparatuses 41, 42 ... 4n on the coordinates. Specifically, when the computing apparatuses 41, 42 ... 4n are deployed in the one-dimensional deployment, the job allocation apparatus 20 may store the positions on the X-coordinate or the Y-coordinate. When the computing apparatuses 41, 42 ... 4n are deployed in the two-dimensional deployment, the job allocation apparatus 20 may store the positions on the XY-coordinates. When the computing apparatuses 41, 42 ... 4n are deployed in the three-dimensional deployment, the job allocation apparatus 20 may store the positions on the XYZ-coordinates.

The usage time management function 28 is a function of storing and managing a usage time of the respective computing apparatuses 41, 42 ... 4n. Specifically, the job allocation apparatus 20 may manage an execution time of a job or accumulated execution times of jobs with respect to the respective computing apparatuses 41, 42 ... 4n.

Figure 5:
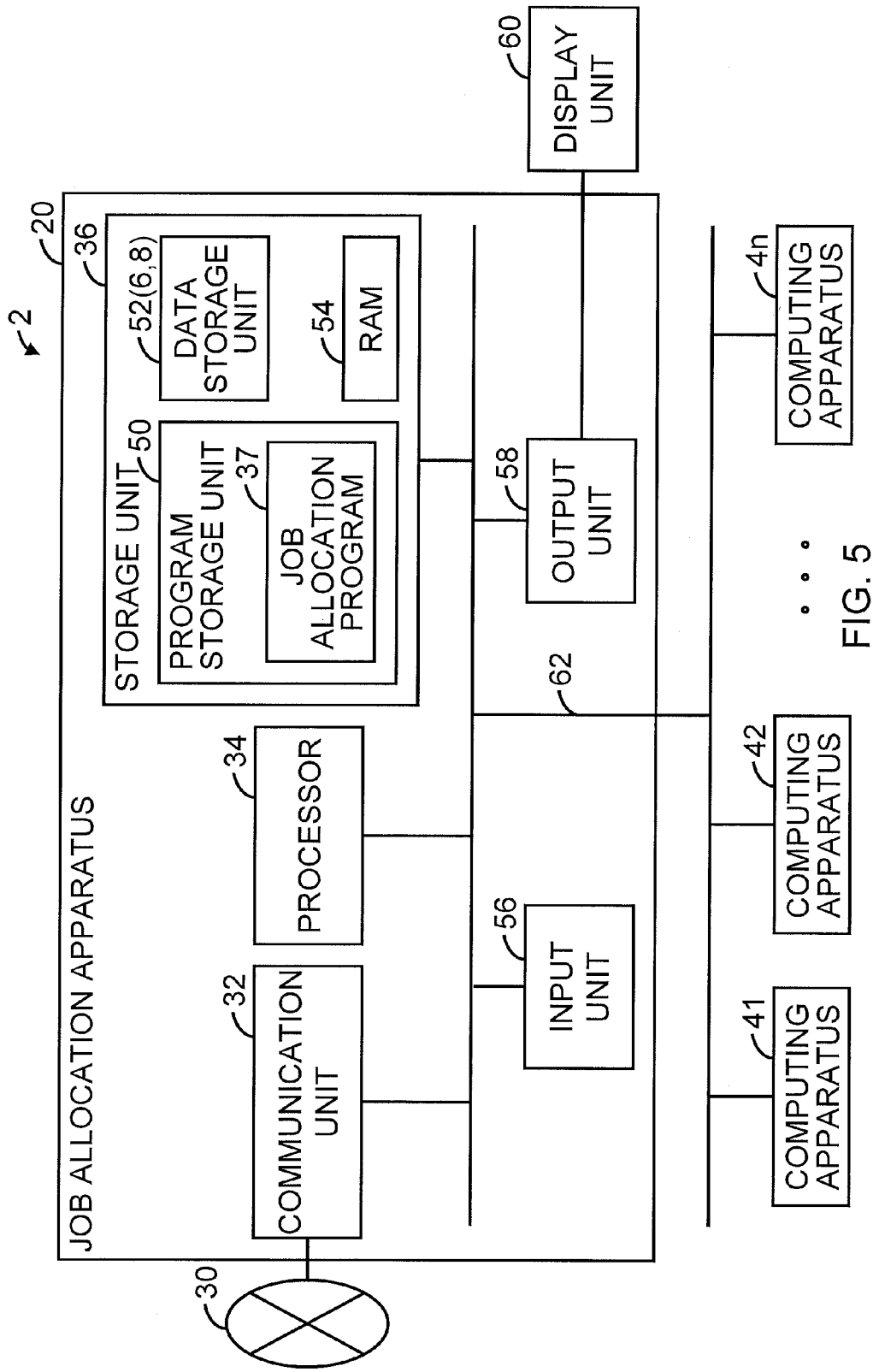
FIG. 5 is a diagram illustrating an exemplary hardware configuration of a job allocation apparatus according to an embodiment of the present invention.

A configuration for achieving the above-mentioned functions will be discussed with reference to FIG. 5. FIG. 5 illustrates an exemplary hardware configuration of the job allocation apparatus 20. The configuration illustrated in FIG. 5 is an example, and the present embodiment is not limited to the configuration illustrated in FIG. 5. In FIG. 5, like components as those in FIG. 1 are assigned with like reference symbols.

As illustrated in FIG. 5, the job allocation apparatus 20 is connected to a network 30. For example, the job allocation apparatus 20 allocates jobs provided over the network 30 to the computing apparatuses 41, 42 ... 4n. The network 30 may be the Internet or an intranet.

A communication unit 32 is an example of means which is connected to the network 30 for a connection to an external apparatus. The communication may be a wired communication using a cable as a medium or a wireless communication using radio waves or the like as a medium.

A processor 34 is, for example, a CPU and an example of an execution agent of a job allocation program 37 of the present embodiment in a storage unit 36, but the function is not limited to the execution of the job allocation program 37. The processor 34 performs various computations and controls such as data storage, computation, and drive control of various functional units in the job allocation apparatus 20 and an externally connected display unit 60.

The storage unit 36 stores programs executed by the processor 34, such as an operating system (OS) and the job allocation program 37, data, and the like. The storage unit 36 includes a program storage unit 50, a data storage unit 52, and a random-access memory (RAM) 54. The program storage unit 50 and the data storage unit 52 may be, for example, a recording medium such as a hard disk drive (HDD), a solid state drive (SSD), a hybrid HDD, a compact disc (CD), a compact disc read-only memory (CD-ROM), CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc. These recording media are examples, and the present embodiment is not limited to these. For example, a program may be stored in a removable recording medium when delivered, installed onto an HDD from the removable recording medium, and loaded into an RAM from the HDD when executed by the CPU.

The program storage unit 50 stores various programs such as the above-mentioned OS and the job allocation program 37 according to the present embodiment. The data storage unit 52 is a storage area for storing various pieces of data used for the execution of the above-mentioned job allocation program 37. Thus, the data storage unit 52 plays the roles of the job allocation information storage unit 6 and the position information storage unit 8. The data storage unit 52 stores data in a table form such as a job allocation table 80 (FIG. 7), position correspondence tables 90A (FIG. 8), 90B (FIG. 13), and 90C (FIG. 16), and a usage time table 110 (FIG. 17) which will be discussed below, but the form of stored data is not limited to the tables.

An input unit 56 is used for inputs of various pieces of data such as data necessary for executing the above-mentioned job allocation program 37 and control inputs. An output unit 58 generates various outputs such as a job allocation output, a display output to the display unit 60, and a printing output. The display unit 60 is means for displaying currently executed processes or the job allocation statuses. The display unit 60 may be, for example, a liquid crystal display (LCD).

The respective components such as the processor 34 are connected through a bus 62, and the above-mentioned computing apparatuses 41, 42 ... 4n are connected to the bus 62 as job allocation targets. The deployment mode for the computing apparatuses 41, 42 ... 4n may be any one of the one-dimensional deployment along the X axis or the Y axis direction, the two-dimensional matrix deployment in the XY axis directions, and the three-dimensional matrix deployment in the XYZ axis directions as discussed above.

Figure 6:
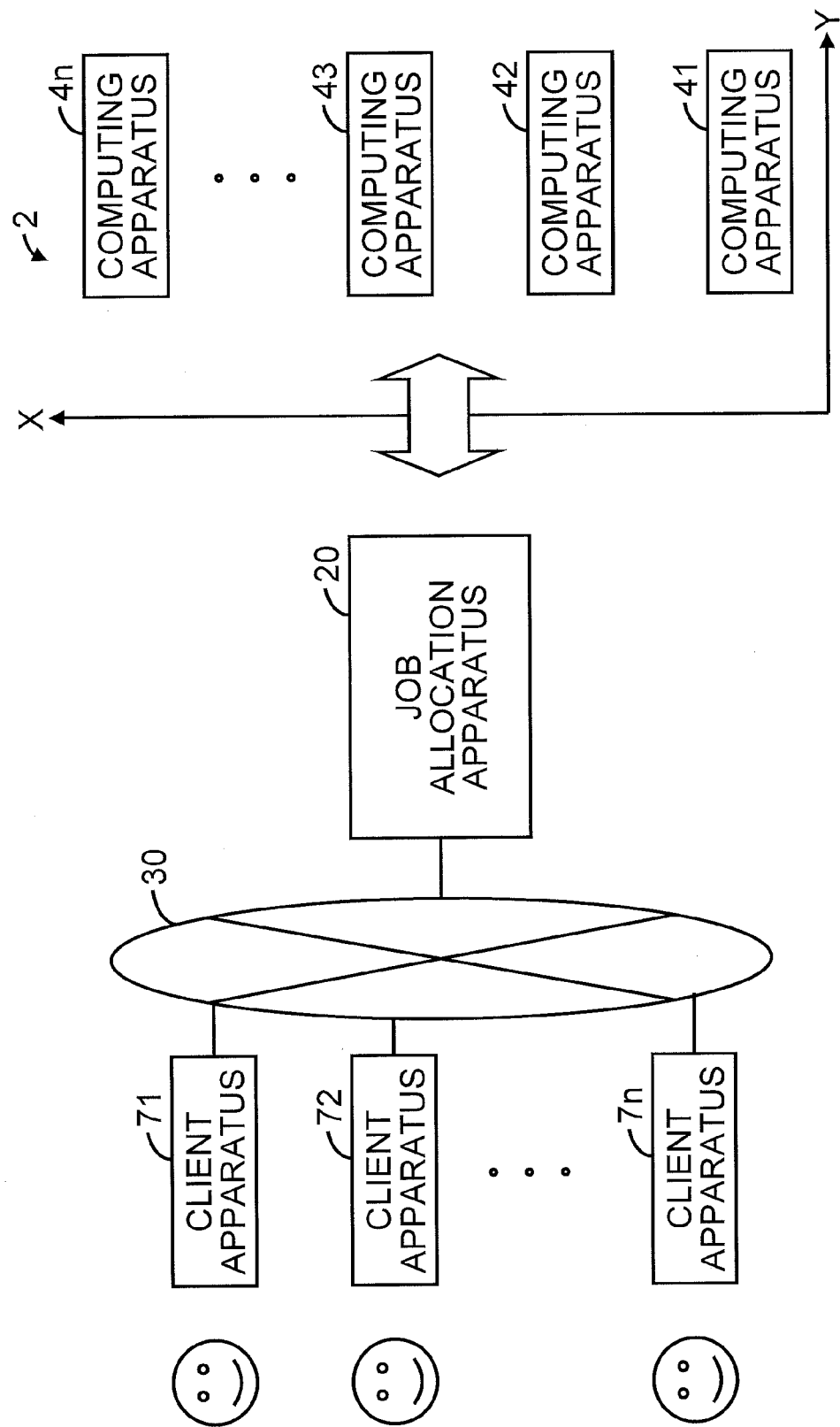
FIG. 6 is a diagram illustrating an exemplary computing system connected to client apparatuses according to an embodiment of the present invention.

A relation with external apparatuses will be discussed with reference to FIG. 6. FIG. 6 illustrates an exemplary computing system connected to client apparatuses according to the present embodiment. A configuration illustrated in FIG. 6 is an example, and the present embodiment is not limited to the configuration illustrated in FIG. 6. In FIG. 6, like components as those in FIG. 5 are assigned with like reference symbols.

A plurality of client apparatuses 71, 72 ... 7n for ordering job execution are connected to the computing system 2 through the above-mentioned network 30. The client apparatuses 71, 72 ... 7n are an example of an external apparatus that is a source ordering job execution, and the number of apparatuses may not necessarily be plural and may also be singular. Also, a configuration may be adopted in which a single or plurality of client apparatuses are connected to the job allocation apparatus 20 without the network 30 to order job execution.

The client apparatus may be, for example, a computer exemplified by the job allocation apparatus 20 illustrated in FIG. 5.

In the exemplary computing system illustrated in FIG. 6, a deployment mode for the computing apparatuses 41, 42 ... 4n is a one-dimensional deployment, but the deployment mode may also be either a two-dimensional deployment or a three-dimensional deployment.

Figure 7:
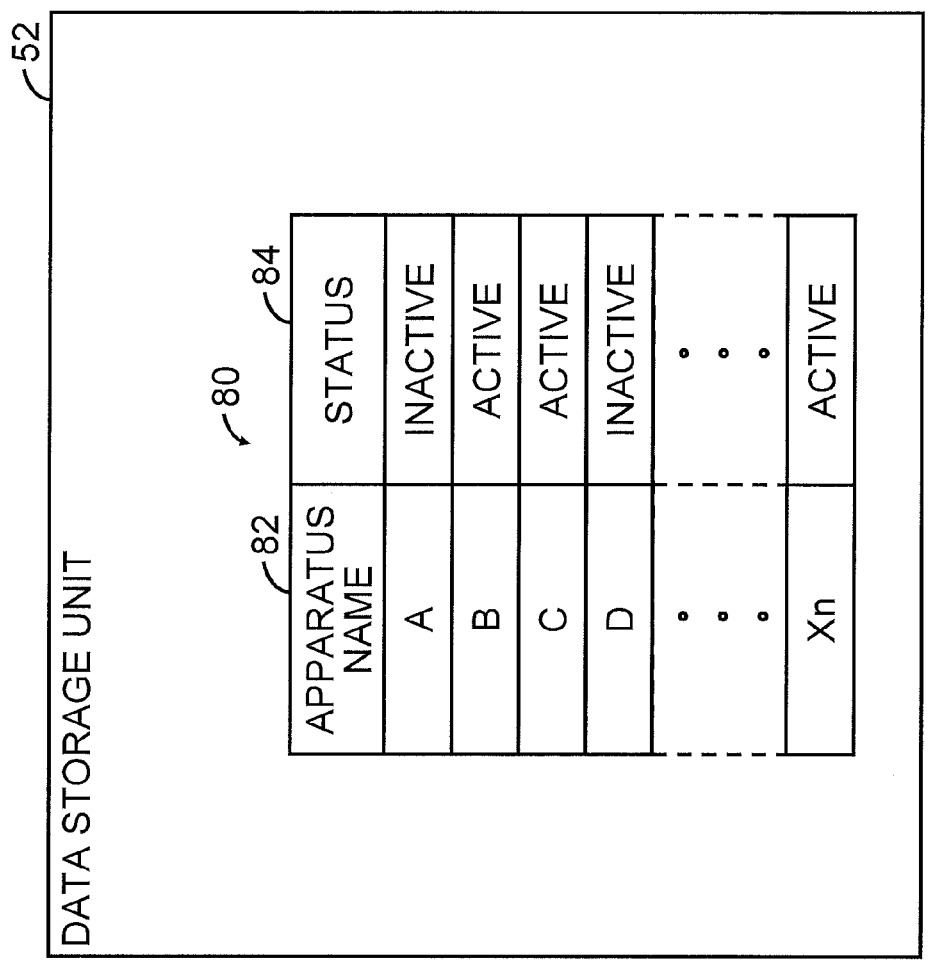
FIG. 7 is a diagram illustrating an exemplary data format of a job allocation table according to an embodiment of the present invention.

The job allocation table 80 will be discussed with reference to FIG. 7. FIG. 7 illustrates an exemplary data format of the job allocation table 80. The table illustrated in FIG. 7 is an example of a data format, and the present embodiment is not limited to the data format illustrated in FIG. 7.

The job allocation table 80 is obtained by putting the job allocation information into a table format and is an example of a data format stored in the data storage unit 52. The job allocation table 80 stores information indicating respective statuses of the large number of computing apparatuses 41, 42 ... 4n, that is, information indicating the job allocation status.

The job allocation table 80 stores, as illustrated in FIG. 7, an apparatus name 82 and a status 84. The apparatus name 82 is an example of identification information for identifying each of the large number of computing apparatuses 41, 42 ... 4n. A, B, C, D ... Xn are apparatus names assigned to the computing apparatuses. The status 84 is information indicating the job allocation status of the respective computing apparatuses, and for example, the information is "ACTIVE" or "INACTIVE". The "ACTIVE" represents a status in which a job is executed on the corresponding computing apparatus. The "INACTIVE" represents a status in which no job is executed on the corresponding computing apparatus.

Another configuration may also be adopted in which the status 84 stores selective information such as "OUT-OF-ORDER", "TO-BE-AVOIDED" for the job allocation so that the job allocation table 80 may assign a selectivity in the job allocation.

Figure 9:
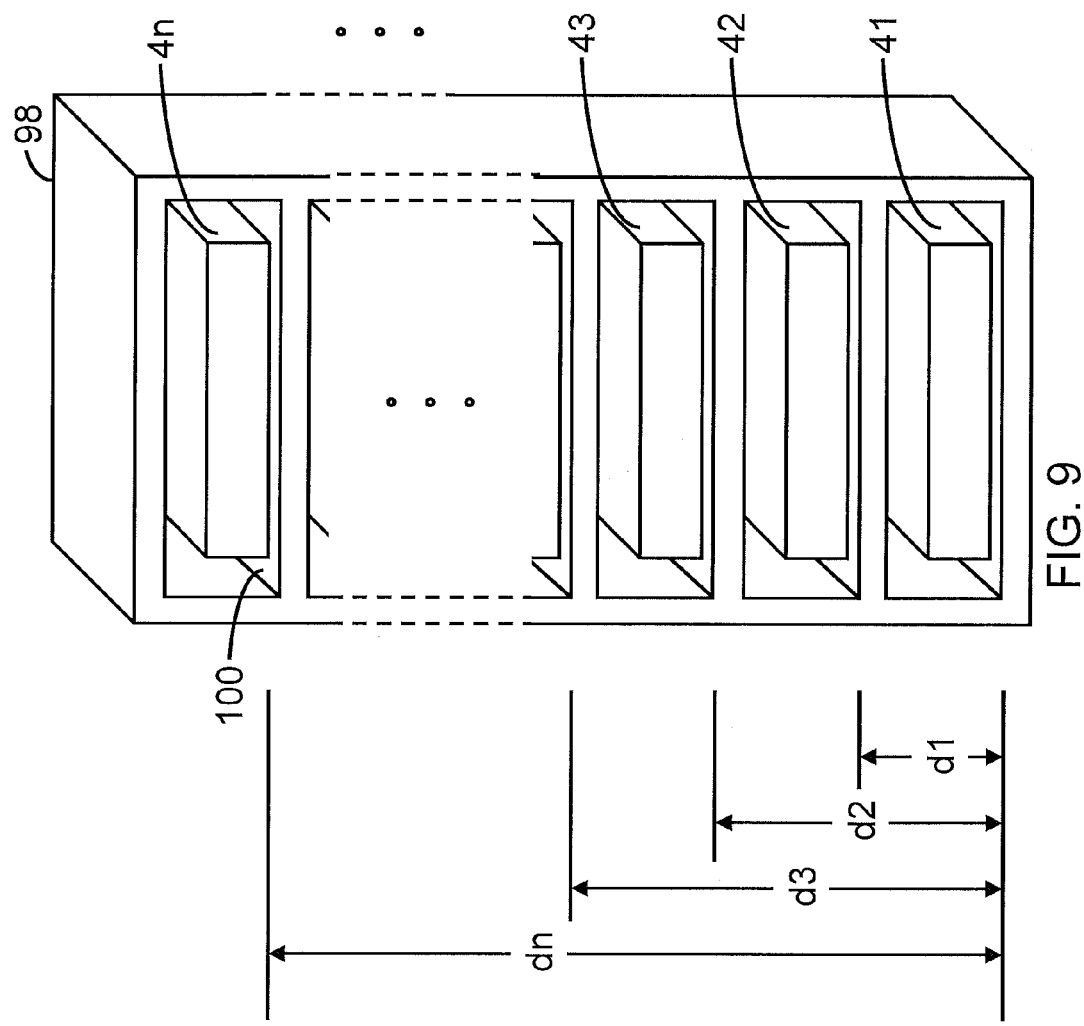
FIG. 9 is a diagram illustrating an exemplary deployment of computing apparatuses according to an embodiment of the present invention.

The position correspondence table 90A, a creation thereof, and the equalization of the exhaust heat will be discussed with reference to FIGS. 8 and 9. FIG. 8 illustrates an exemplary data format of the position correspondence table 90A. FIG. 9 illustrates an exemplary deployment of the computing apparatuses. The table illustrated in FIG. 8 is an example of a data format, the deployment illustrated in FIG. 9 is an example, and the present embodiment is not limited to the data format illustrated in FIG. 8 or the deployment illustrated in FIG. 9.

The position correspondence table 90A is obtained by putting the position information of the computing apparatus on the coordinate into a table format and is an example of a data format stored in the data storage unit 52. The position correspondence table 90A stores the position information on the X axis, which is the one-dimensional positions of the large number of computing apparatuses 41, 42 ... 4n.

The position correspondence table 90A stores, as illustrated in FIG. 8, an apparatus name 92 and a coordinate 94. The apparatus name 92 is an example of identification information for identifying each of the large number of computing apparatuses 41, 42 ... 4n. A, B, C, D ... Xn are the apparatus names assigned to the computing apparatuses and correspond to the apparatus names 82 of the job allocation table 80 discussed above. The coordinate 94 includes a coordinate name. In this case, "X AXIS" is set, and an X axis 96 stores the position information on the relevant coordinate.

As illustrated in FIG. 9, for example, the large number of computing apparatuses 41, 42, 43 ... 4n are individually installed on respective shelves 100 in a single rack 98. In the case of the one-dimensional deployment, distances d of the respective computing apparatuses 42, 43 ... 4n from the computing apparatus 41 at a lowermost part of the rack 98 are set as d1, d2 ... dn. In a case where the distance d is represented by a position on the X axis, it is supposed that d1=3, d2=5, d3=7, and d4=9. The position on the X axis is associated with the apparatus name 92 on the basis of the position information, and the position correspondence table 90A may be created as illustrated in FIG. 8.

In the equalization process of the exhaust heat from thus deployed computing apparatuses 41, 42, 43 ... 4n, the job allocation apparatus 20 executes the above-mentioned job allocation program 37 (FIG. 5) to read the position correspondence table 90A. The job allocation apparatus 20 calculates, for each inactive computing apparatus, a total sum of inverse numbers of the distances d from respective active computing apparatuses. The job allocation apparatus 20 selects an inactive computing apparatus $4x$ having the smallest total sum as a candidate inactive computing apparatus to which the next job is allocated.

When distances between an inactive computing apparatus $4x$ and each of the active computing apparatuses A1, A2 ... An are represented by d(A1), d(A2) ... d(An), an equalization index may be obtained from the following expression.

$$\text{The equalization index} = 1/d(A1) + 1/d(A2) + \ldots + 1/d(An) \quad (1)$$

The job allocation apparatus 20 selects an inactive computing apparatus $4x$ having the smallest equalization index as the candidate inactive computing apparatus.

When the job allocation apparatus 20 selects an inactive computing apparatus $4x$ having the smallest equalization index of the one-dimensional deployment as the candidate inactive computing apparatus and allocates the new job to the selected candidate inactive computing apparatus, the distribution of the exhaust heat may be equalized. Therefore, when the distribution of the exhaust heat is equalized, the concentration or bias of the exhaust heat may be avoided, and it is therefore possible to avoid a situation in which an active computing apparatus is put in an unnecessarily high temperature state.

Figure 10:
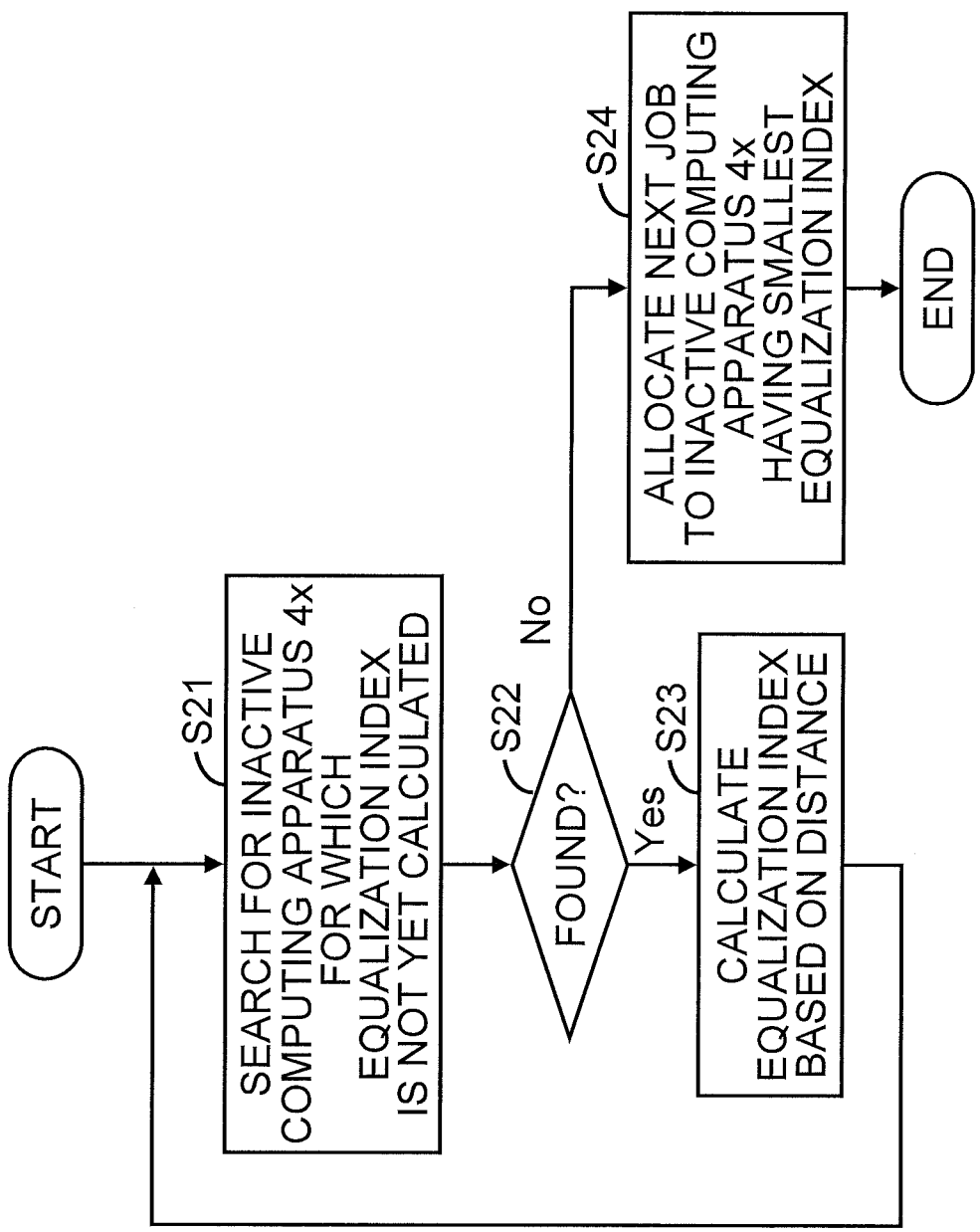
FIG. 10 is a diagram illustrating an exemplary operation flow of a job allocation process according to an embodiment of the present invention.

A job allocation process will be discussed with reference to FIG. 10. FIG. 10 illustrates an exemplary operation flow of a job allocation process according to the present embodiment. The operation flow illustrated in FIG. 10 is an example, and the present embodiment is not limited to the operation flow illustrated in FIG. 10.

The operation flow is an example of a job allocation method executed by a computing system according to the present embodiment. In the operation flow, the job allocation apparatus 20 calculates an equalization index for each inactive computing apparatus on the basis of an added value of the inverse numbers of the distances from the active computing apparatuses, and selects an optimal inactive computing apparatus to which the next job is allocated on the basis of the calculated equalization index.

In S21, the job allocation apparatus 20 refers to the job allocation table 80 to search for an inactive computing apparatus $4x$, from the computing apparatuses 41, 42 ... 4n, for which the equalization index is not yet calculated.

In S22, the job allocation apparatus 20 determines whether or not an inactive computing apparatus $4x$ for which the equalization index is not yet calculated is found.

In S23, when an inactive computing apparatus 4x for which the equalization index is not yet calculated is found ("Yes" in S22), the job allocation apparatus 20 refers to the job allocation table 80 and the position correspondence table 90A to calculate the equalization index in accordance with the above-mentioned expression (1) on the basis of the distances d(A1), d(A2) . . . d(An) of the respective active computing apparatuses A1, A2 . . . An from the inactive computing apparatus 4x.

Thereafter, the job allocation apparatus 20 returns the process to S21.

In S24, when an inactive computing apparatus 4x for which the equalization index is not yet calculated is not found ("No" in S22), the job allocation apparatus 20 compares all the equalization indices with one another, and selects an inactive computing apparatus 4x having the smallest equalization index as a candidate inactive computing apparatus to which the next job is allocated.

When execution of the next job is instructed, the job allocation apparatus 20 allocates the next job to the selected inactive computing apparatus 4x.

Through the above-mentioned equalization process, the optimal computing apparatus to which the next job is allocated is selected and the next job is allocated to the selected computing apparatus, so that effects similar to the first embodiment may be obtained, such that the exhaust heat may be equalized, for example.

Third Embodiment

Figure 11:
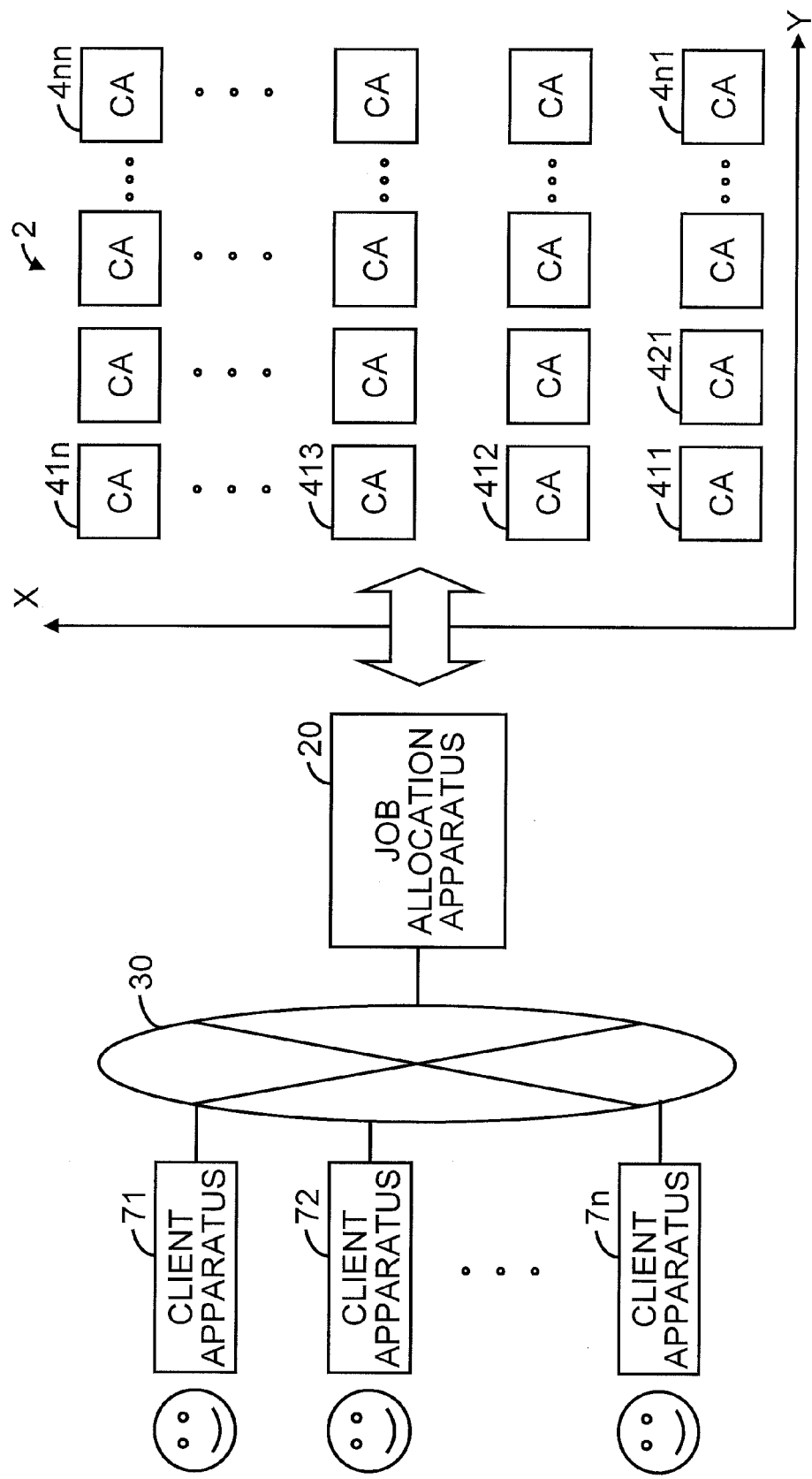
FIG. 11 is a diagram illustrating an exemplary computing system connected to client apparatuses according to an embodiment of the present invention.
Figure 12:
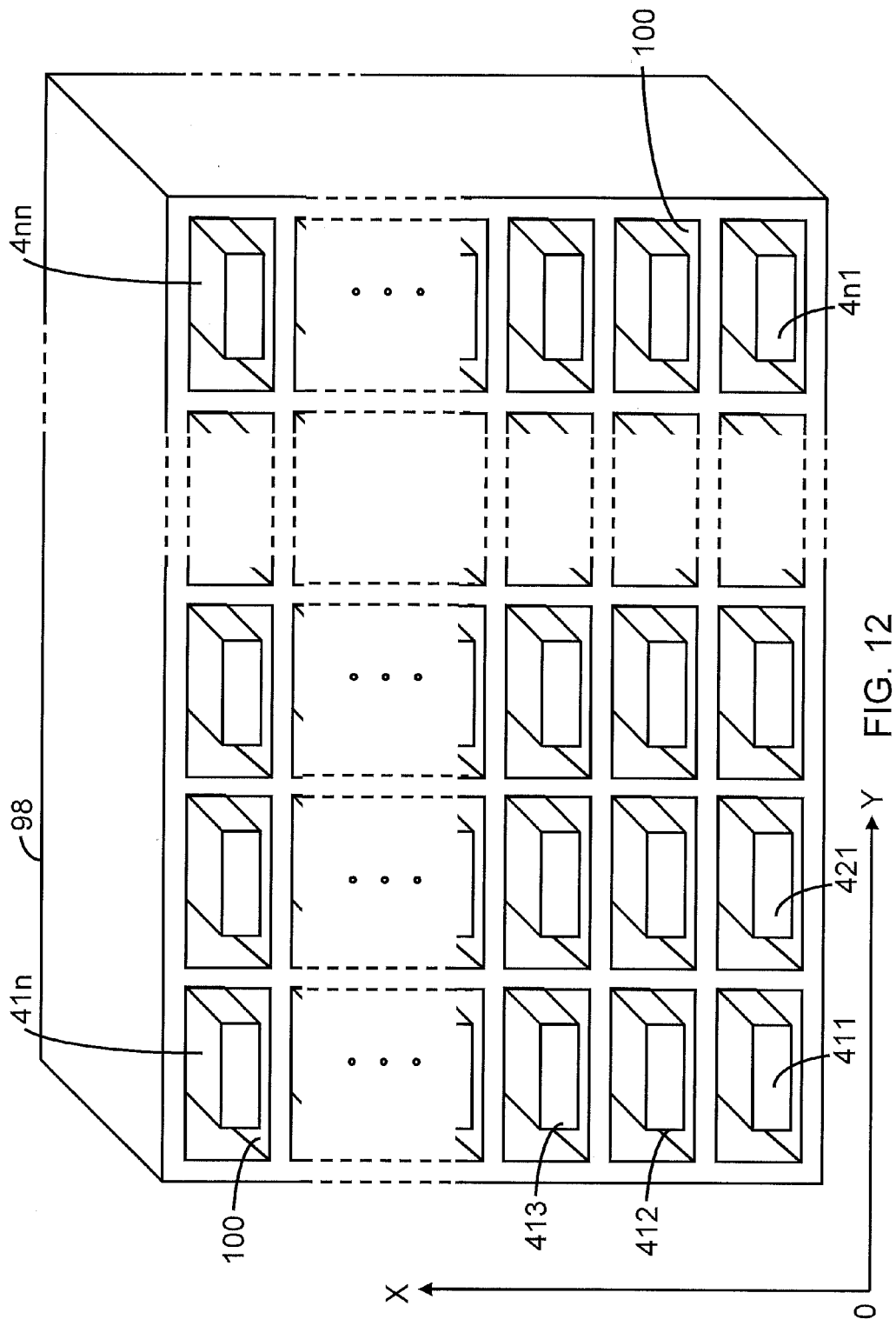
FIG. 12 is a diagram illustrating an exemplary deployment of computing apparatuses according to an embodiment of the present invention.

A third embodiment will be discussed with reference to FIGS. 11, 12, and 13. FIG. 11 illustrates an exemplary computing system according to the present embodiment. FIG. 12 illustrates an exemplary two-dimensional deployment of the computing apparatuses. FIG. 13 illustrates an exemplary data format of the position correspondence table 90B. Configurations illustrated in FIGS. 11, 12, and 13 are examples, and the present embodiment is not limited to the configurations illustrated in FIGS. 11, 12, and 13. In FIGS. 11, 12, and 13, like elements as those in FIG. 6 and FIG. 8 are assigned with like reference symbols. A computing apparatus is also represented by "CA" in the drawings.

As illustrated in FIG. 11, the present embodiment is in a case of the two-dimensional deployment of a large number of computing apparatuses 411, 412, 413 . . . 41n, 421 . . . 4n1 . . . 4nn. According to the present embodiment too, the plurality of client apparatuses 71, 72 . . . 7n are connected to the computing system 2 through the network 30, and a job to be executed is provided from the plurality of client apparatuses 71, 72 . . . 7n.

As illustrated in FIG. 12, the large number of computing apparatuses 411, 412, 413 . . . 41n, 421 . . . 4n1 . . . 4nn are installed in the rack 98 where a plurality of shelves 100 are deployed in the X axis direction and the Y axis direction. In this case, when the 0 point position on the X axis and the Y axis is set for the computing apparatus 411, the position correspondence table 90B as illustrated in FIG. 13 may be created by reading the distances on the X axis or on the Y axis from the 0 point position to the respective computing apparatuses, that is, the positions on the coordinate.

The position correspondence table 90B stores, as illustrated in FIG. 13, an apparatus name 92 and a coordinate 94. A, B, C, D . . . Xn are the apparatus names assigned to the computing apparatuses. The coordinate 94 includes coordinate names. In this case, "X AXIS" and "Y AXIS" are set corresponding to the two-dimensional deployment. An X axis 96 and a Y axis 102 store the position information on the relevant coordinates.

Like the second embodiment, in the equalization process of the exhaust heat from thus deployed computing apparatuses 411, 412, 413 . . . 41n, 421 . . . 4n1 . . . 4nn according to the two-dimensional deployment, the job allocation apparatus 20 executes the above-mentioned job allocation program 37 (FIG. 5) to read the position correspondence table 90B. The job allocation apparatus 20 calculates, for each inactive computing apparatus, a total sum of inverse numbers of the distances d from respective active computing apparatuses. The job allocation apparatus 20 selects an inactive computing apparatus 4x having the smallest total sum as a candidate inactive computing apparatus to which the next job is allocated.

In the two-dimensional deployment, the job allocation apparatus 20 may select an inactive computing apparatus 4x having the smallest equalization index as the candidate inactive computing apparatus on the basis of the equalization indices calculated in accordance with the above-mentioned expression (1).

When the job allocation apparatus 20 allocates the new job to the selected candidate inactive computing apparatus 4x, the distribution of the exhaust heat may be equalized also in the two-dimensional deployment of the large number of computing apparatuses. Therefore, according to the present embodiment too, when the distribution of the exhaust heat is equalized, the concentration or bias of the exhaust heat may be avoided, and it is therefore possible to avoid a situation in which an active computing apparatus is put in an unnecessarily high temperature state.

Fourth Embodiment

Figure 14:
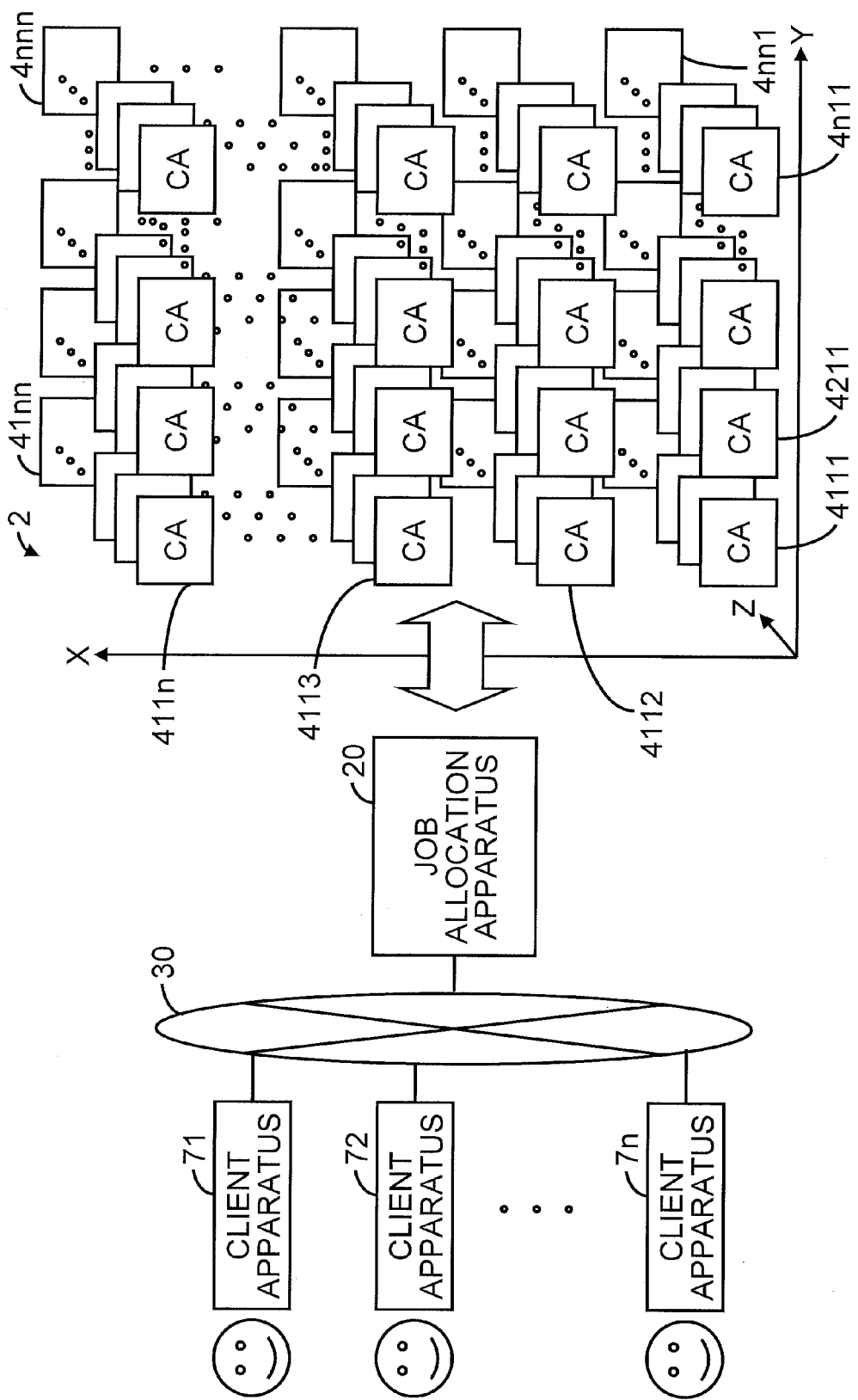
FIG. 14 is a diagram illustrating an exemplary computing system connected to client apparatuses according to an embodiment of the present invention.
Figure 15:
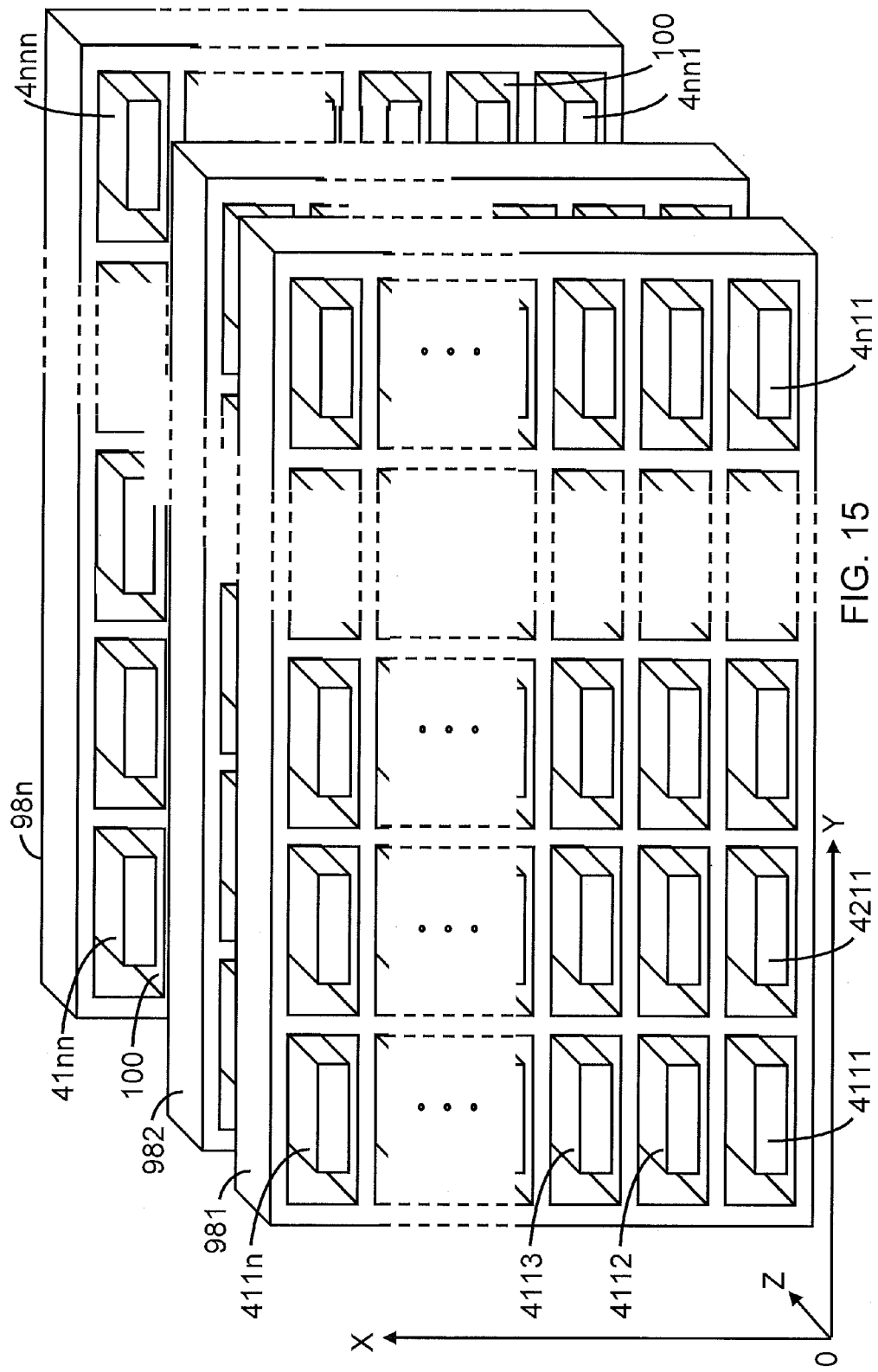
FIG. 15 is a diagram illustrating an exemplary deployment of computing apparatuses according to an embodiment of the present invention.

A fourth embodiment will be discussed with reference to FIGS. 14, 15, and 16. FIG. 14 illustrates an exemplary computing system according to the present embodiment. FIG. 15 illustrates an exemplary three-dimensional deployment of the computing apparatuses. FIG. 16 illustrates an exemplary data format of the position correspondence table 90C. Configurations illustrated in FIGS. 14, 15, and 16 are examples, and the present embodiment is not limited to the configurations illustrated in FIGS. 14, 15, and 16. In FIGS. 14, 15, and 16, like elements as those in FIG. 6 and FIG. 8 are assigned with like reference symbols.

As illustrated in FIG. 14, the present embodiment is in a case of the three-dimensional deployment of a large number of computing apparatuses 4111, 4112, 4113 . . . 411n, 4211 . . . 4n11 . . . 41nn . . . 4nn1 . . . 4nnn. According to the present embodiment too, the plurality of client apparatuses 71, 72 . . . 7n are connected to the computing system 2 through the network 30, and a job to be executed is provided from the plurality of client apparatuses 71, 72 . . . 7n.

As illustrated in FIG. 15, the large number of computing apparatuses 4111, 4112, 4113 . . . 411n, 4211 . . . 4n11 . . . 41nn . . . 4nn1 . . . 4nnn are installed in a plurality of racks 981, 982 . . . 98n where a plurality of shelves 100 are deployed in a three-dimensional matrix manner in the X axis direction, the Y axis direction, and the Z axis direction. In this case, when the 0 point position on the X axis, the Y axis, and the Z axis is set for the computing apparatus 4111, the position correspondence table 90C as illustrated in FIG. 15 may be created by reading the distances on the X axis, on the Y axis, or on the Z axis from the 0 point position to the respective computing apparatuses, that is, the positions on the coordinates.

The position correspondence table 90C stores, as illustrated in FIG. 16, an apparatus name 92 and a coordinate 94. A, B, C, D . . . Xn are the apparatus names assigned to the computing apparatuses. The coordinate 94 includes coordinate names. In this case, "X AXIS", "Y AXIS", and "Z AXIS" are set corresponding to the three-dimensional deployment. An X axis 96, a Y axis 102, and a Z axis 104 store the position information on the relevant coordinates.

Like the second embodiment, in the equalization process of the exhaust heat from thus deployed computing apparatuses 4111, 4112, 4113 . . . 411n, 4211 . . . 4n11 . . . 41nn . . . 4nn1 . . . 4nnn according to the three-dimensional deployment, the job allocation apparatus 20 executes the above-mentioned job allocation program 37 (FIG. 5) to read the position correspondence table 90C. The job allocation apparatus 20 calculates, for each inactive computing apparatus, a total sum of inverse numbers of the distances d from respective active computing apparatuses. The job allocation apparatus 20 selects an inactive computing apparatus 4x having the smallest total sum as a candidate inactive computing apparatus to which the next job is allocated.

In the three-dimensional deployment, the job allocation apparatus 20 may select an inactive computing apparatus 4x having the smallest equalization index as the candidate inactive computing apparatus on the basis of the equalization indices calculated in accordance with the above-mentioned expression (1).

When the job allocation apparatus 20 allocates the new job to the selected candidate inactive computing apparatus 4x, the distribution of the exhaust heat may be equalized also in the three-dimensional deployment of the plurality of computing apparatuses. Therefore, according to the present embodiment too, when the distribution of the exhaust heat is equalized, the concentration or bias of the exhaust heat may be avoided, and it is therefore possible to avoid a situation in which an active computing apparatus is put in an unnecessarily high temperature state.

Fifth Embodiment

A fifth embodiment will be discussed with reference to FIG. 17. FIG. 17 illustrates an exemplary data format of a usage time table 110 used in the computing system 2 according to the present embodiment. The configuration illustrated in FIG. 17 is an example, and the present embodiment is not limited to the configuration illustrated in FIG. 17. In FIG. 17, like elements as those in FIG. 5 are assigned with like reference symbols.

According to the present embodiment, the job allocation apparatus 20 performs the equalization process by taking into account a usage time. When the job allocation apparatus 20 continues the equalization process of the exhaust heat, a probability of allocating a new job to an inactive computing apparatus 4x located at a center part of the computing system 2 tends to be high. In the computing apparatus having a high probability of job allocation, the usage time lengthens, and a failure rate increases due to the concentration of the exhaust heat or the degradation. To avoid the above-mentioned inconvenience, the job allocation apparatus 20 may perform the equalization process while taking into account a usage time.

In the equalization process taking into account the usage time, the job allocation apparatus 20 manages a total usage time for each of the computing apparatuses to avoid the concentration of the usage time. The job allocation apparatus 20 records the total usage time in association with the apparatus name. According to the present embodiment, the job allocation apparatus 20 uses the usage time table 110 in which the total usage time is recorded.

The usage time table 110 stores, as illustrated in FIG. 17, an apparatus name 112 and a total usage time 114. The apparatus name 112 is an example of identification information for identifying each of the large number of computing apparatuses 41, 42 . . . 4n. A, B, C, D . . . Xn are apparatus names assigned to the computing apparatuses. The total usage time 114 is a value h(x) indicating an integrated value of the individual usage times of the respective computing apparatuses 41, 42 . . . 4n.

In the equalization process taking into account the usage time, when the distances between an inactive computing apparatus 4x and each of the active computing apparatuses A1, A2 . . . An are represented by d(A1), d(A2) . . . d(An), and the total usage time of the inactive computing apparatus 4x is represented by h(x), an equalization index may be obtained from the following expression.

$$\text{The equalization index} = [1/d(A1) + 1/d(A2) + \ldots + 1/d(An)] \times a \times h(x) \quad (2)$$

In the expression (2), "a" denotes a load coefficient indicating how much the total usage time is taken into account.

The job allocation apparatus 20 selects an inactive computing apparatus 4x having the smallest equalization index as the candidate inactive computing apparatus.

Figure 18:
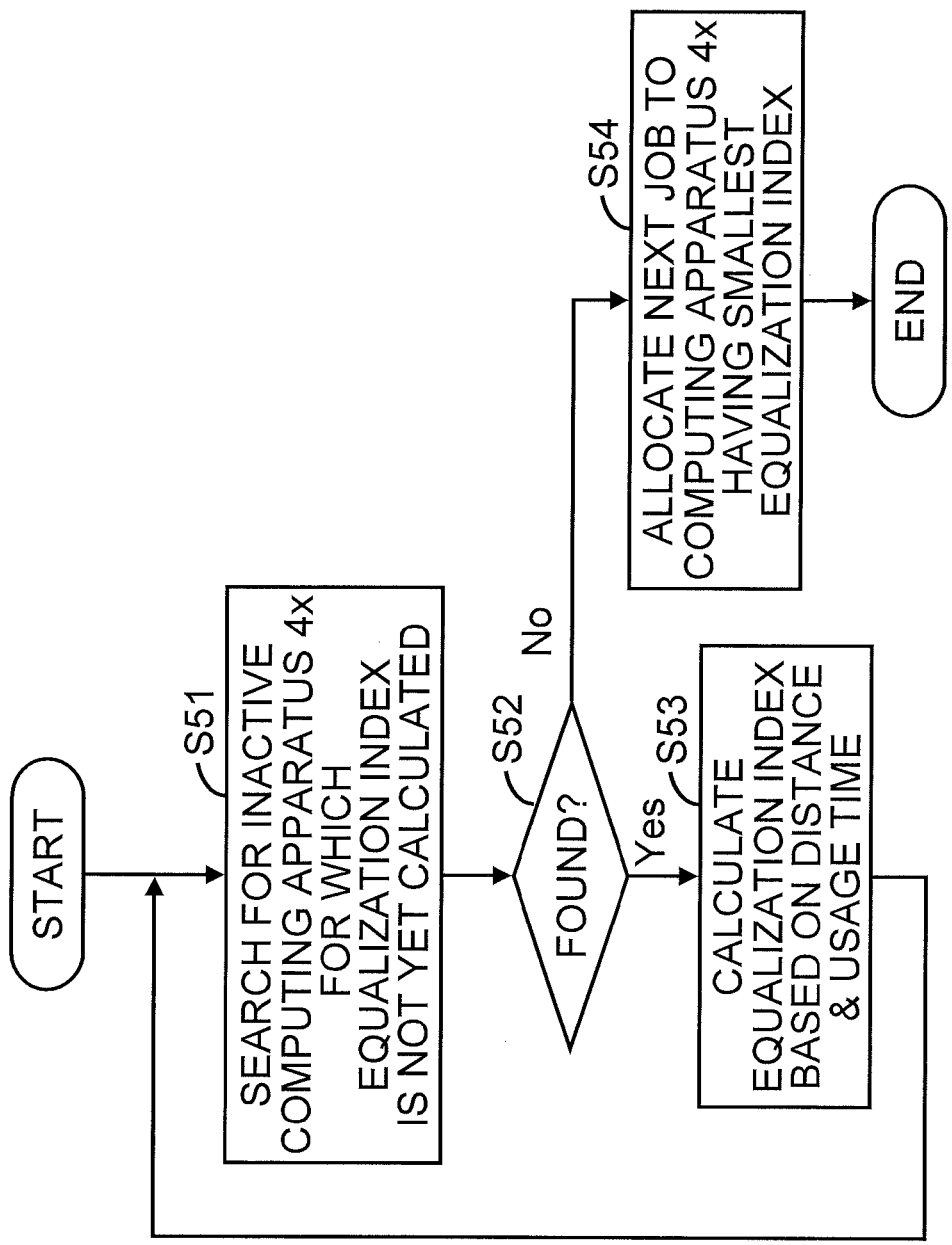
FIG. 18 is a diagram illustrating an exemplary operation flow of a job allocation process according to an embodiment of the present invention.

A job allocation process will be discussed with reference to FIG. 18. FIG. 18 illustrates an exemplary operation flow of a job allocation process according to the present embodiment. The operation flow illustrated in FIG. 18 is an example, and the present embodiment is not limited to the operation flow illustrated in FIG. 18.

The operation flow is an example of a job allocation method executed by a computing system according to the present embodiment. In the operation flow, the job allocation apparatus 20 calculates an equalization index for each inactive computing apparatuses on the basis of an added value of the inverse numbers of the distances from, the active computing apparatus and the total usage time, and selects an optimal inactive computing apparatus to which the next job is allocated on the basis of the calculated equalization index.

In S51, the job allocation apparatus 20 refers to the job allocation table 80 (FIG. 7) to search for an inactive computing apparatus 4x, from the computing apparatuses 41, 42 . . . 4n, for which the equalization index is not yet calculated.

In S52, the job allocation apparatus 20 determines whether or not an inactive computing apparatus 4x for which the equalization index is not yet calculated is found.

In S53, when an inactive computing apparatus 4x for which the equalization index is not yet calculated is found ("Yes" in S52), the job allocation apparatus 20 refers to the job allocation table 80, the position correspondence table 90A (or 90B, or 90C) and the usage time table 110 to calculate the equalization index in accordance with the expression (2) on the basis of the distances d(A1), d(A2) . . . d(An) of the respective active computing apparatuses A1, A2 . . . An from the inactive computing apparatus 4x and the total usage time h(x) of the inactive computing apparatus 4x.

Thereafter, the job allocation apparatus 20 returns the process to S51.

In S54, when an inactive computing apparatus 4x for which the equalization index is not yet calculated is not found ("No" in S52), the job allocation apparatus 20 compares all the equalization indices with one another, and selects an inactive computing apparatus 4x having the smallest equalization index as a candidate inactive computing apparatus to which the next job is allocated.

When execution of the next job is instructed, the job allocation apparatus 20 allocates the next job to the selected inactive computing apparatus 4x.

In this manner, the distribution of the exhaust heat may be equalized while taking into account the usage time of the computing apparatus.

When the distribution of the exhaust heat is equalized, the concentration or bias of the exhaust heat may be avoided, and it is therefore possible to avoid a situation in which an active computing apparatus is put in an unnecessarily high temperature state. Furthermore, the failure rate of a computing apparatus due to the concentration of the usage time may be decreased.

Sixth Embodiment

Figure 19:
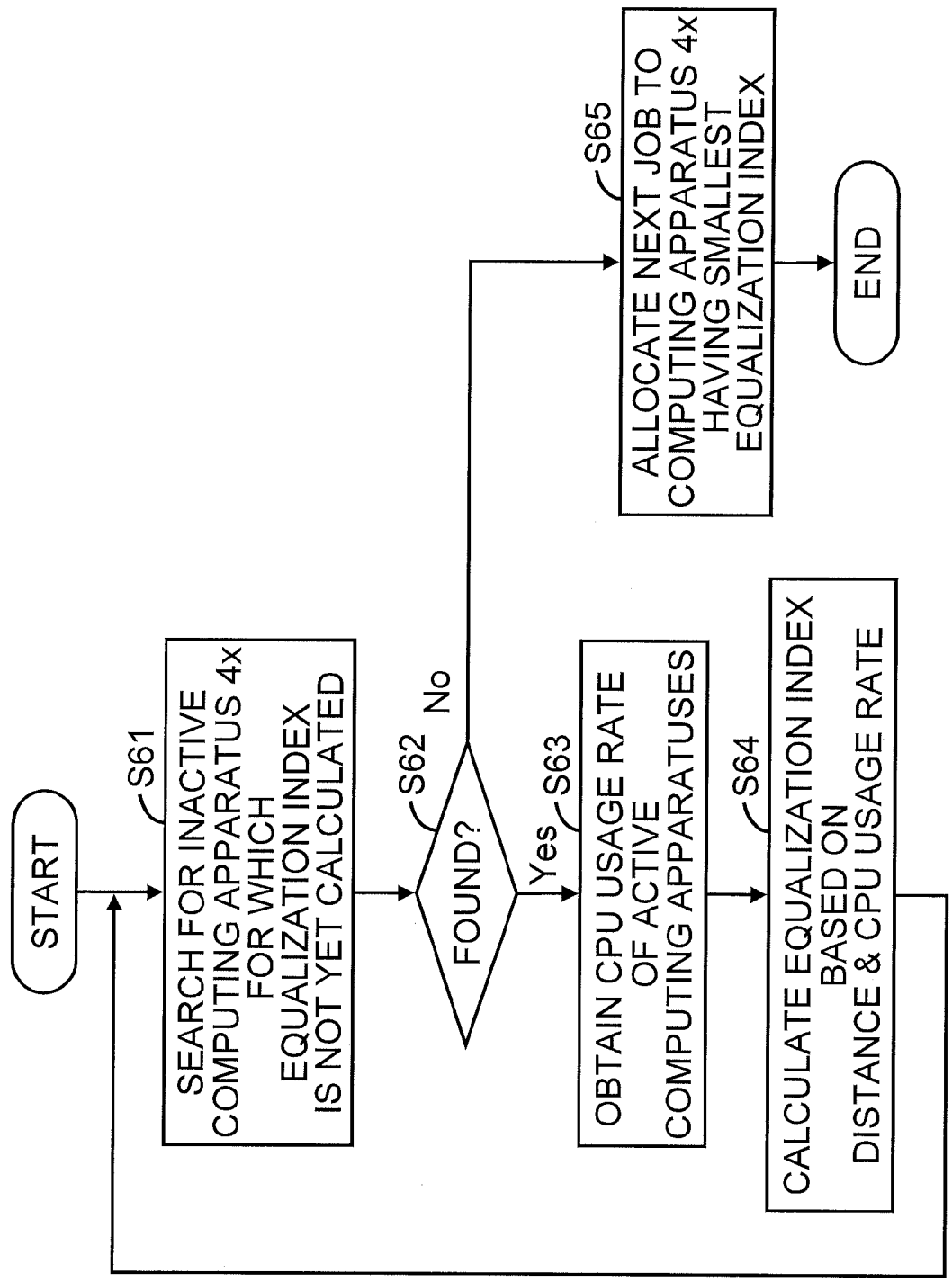
FIG. 19 is a diagram illustrating an exemplary operation flow of a job allocation process according to an embodiment of the present invention.

A sixth embodiment will be discussed with reference to FIG. 19. FIG. 19 illustrates an exemplary operation flow of a job allocation process according to the present embodiment. The operation flow illustrated in FIG. 19 is an example, and the present embodiment is not limited to the operation flow illustrated in FIG. 19.

According to the present embodiment, the job allocation apparatus 20 performs the equalization process while taking into account a CPU usage rate. The CPU usage rate is an example of a usage rate of a processor and changes for each of the computing apparatuses 41, 42 ... 4n in response to execution of jobs, and the exhaust heat depends on the CPU usage rate. Each of the computing apparatuses includes a CPU which is an execution agent of the job, and when the CPU usage rates vary, the respective computing apparatuses discharge the exhaust heat in accordance with the CPU usage rate.

The job allocation apparatus 20 obtains information regarding the CPU usage rate from the respective computing apparatuses, and performs the equalization process on the basis of the obtained CPU usage rates. When the distances between an inactive computing apparatus 4x and each of the active computing apparatuses A1, A2 ... An are represented by d(A1), d(A2) ... d(An), and the CPU usage rates of the active computing apparatus A1, A2 ... An are represented by p(A1), p(A2) ... p(An), an equalization index may be obtained from the following expression.

The equalization index=$p(A1)/d(A1)+p(A2)/d(A2)+\ldots+p(An)/d(An)$ (3)

The job allocation apparatus 20 selects an inactive computing apparatus 4x having the smallest equalization index as the candidate inactive computing apparatus.

The operation flow is an example of a job allocation method executed by a computing system according to the present embodiment. In the operation flow, the job allocation apparatus 20 calculates an equalization index for each inactive computing apparatuses on the basis of an added value of the inverse numbers of the distances from the active computing apparatus and the CPU usage rates, and selects an optimal inactive computing apparatus to which the next job is allocated on the basis of the calculated equalization index.

In S61, the job allocation apparatus 20 refers to the job allocation table 80 (FIG. 7) to search for an inactive computing apparatus 4x, from the computing apparatuses 41, 42 ... 4n, for which the equalization index is not yet calculated.

In S62, the job allocation apparatus 20 determines whether or not an inactive computing apparatus 4x for which the equalization index is not yet calculated is found.

In S63, when an inactive computing apparatus 4x for which the equalization index is not yet calculated is found ("Yes" in S62), the job allocation apparatus 20 obtains the CPU usage rates p(A1), p(A2) ... p(An) of all the active computing apparatuses A1, A2 ... An at that time.

In S64, the job allocation apparatus 20 refers to the job allocation table 80 (FIG. 7) and the position correspondence table 90A (or 90B, or 90C) to calculate the equalization index in accordance with the expression (3) on the basis of the distances d(A1), d(A2) ... d(An) of the respective active computing apparatuses A1, A2 ... An from the computing apparatus 4x and the CPU usage rates p(A1), p(A2) ... p(An) of the respective active computing apparatuses A1, A2 ... An.

Thereafter, the job allocation apparatus 20 returns the process to S61.

In S65, when an inactive computing apparatus 4x for which the equalization index is not yet calculated is not found ("No" in S62), the job allocation apparatus 20 compares all the equalization indices with one another, and selects an inactive computing apparatus 4x having the smallest equalization index as a candidate inactive computing apparatus to which the next job is allocated.

When execution of the next job is instructed, the job allocation apparatus 20 allocates the next job to the selected inactive computing apparatus 4x.

In this manner, the optimization of the job allocation to the computing apparatuses may be achieved by calculating the equalization index with reference to the CPU usage rates. Therefore, effects similar to or superior to the first embodiment may be obtained, such that the exhaust heat may be equalized, for example.

Seventh Embodiment

Figure 20:
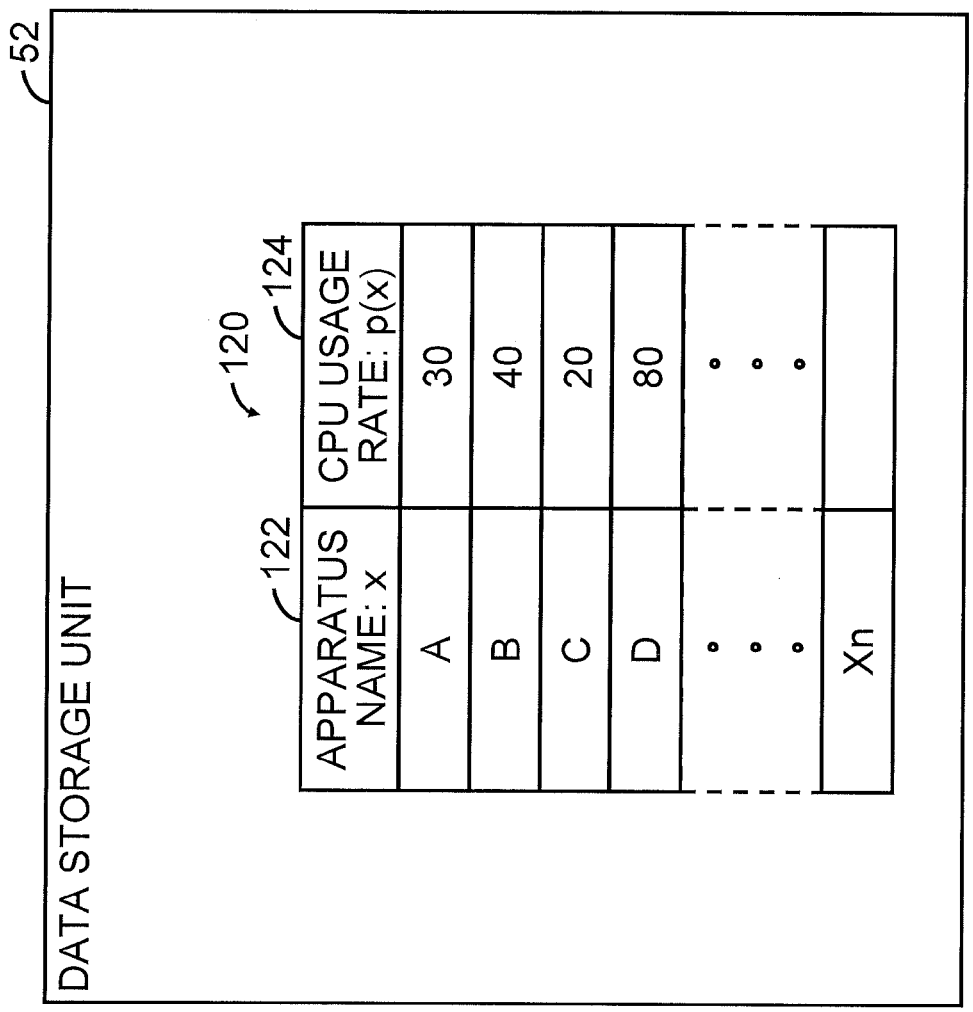
FIG. 20 is a diagram illustrating an exemplary data format of a CPU usage rate table according to an embodiment of the present invention.

A seventh embodiment will be discussed with reference to FIG. 20. FIG. 20 illustrates an exemplary data format of a CPU usage rate table 120 according to the present embodiment.

In the equalization process of the exhaust heat according to the present embodiment, the job allocation apparatus 20 uses CPU usage rate information with respect to the respective computing apparatuses. The job allocation apparatus 20 obtains the CPU usage rate from the respective active computing apparatuses. The job allocation apparatus 20 may record the obtained CPU usage rate to update and manage.

According to the present embodiment, the job allocation apparatus 20 uses, for the management of the CPU usage rate, a CPU usage rate table 120 in which the CPU usage rate is recorded in association with the apparatus name.

The CPU usage rate table 120 stores, as illustrated in FIG. 20, an apparatus name 122 and a CPU usage rate 124. The apparatus name 122 is an example of identification information for identifying each of the large number of computing apparatuses 41, 42 ... 4n. A, B, C, D ... Xn are the apparatus names assigned to the computing apparatuses. The CPU usage rate 124 is a value p(x) indicating the individual CPU usage rate of the respective computing apparatuses 41, 42 ... 4n.

The job allocation apparatus 20 may perform the job allocation with reference to the CPU usage rates by managing the above-mentioned CPU usage rate table 120 while recording the CPU usage rates in association with the respective computing apparatuses 41, 42 ... 4n and timely updating the recorded CPU usage rates. For example, the job allocation apparatus 20 may select an inactive computing apparatus having a low CPU usage rate as the candidate inactive computing apparatus.

In this manner, as the job allocation apparatus 20 may monitor and manage the CPU usage rates of inactive computing apparatuses, calculation of the equalization index may be accelerated and speeding-up of the process may be achieved. Even when the CPU usage rates are not promptly obtained from the computing apparatuses, the job allocation apparatus 20 may calculate the equalization index by storing a predicted value of the CPU usage rate in the CPU usage rate table 120 and utilizing the stored predicted value for the calculation of the equalization index, thus acceleration of the equalization process may be achieved.

Other Embodiments (1) According to the above-mentioned embodiments, the job allocation apparatus 20 calculates the equalization index when selecting a candidate inactive computing apparatus to which the next job is allocated. Examples of the equalization index are based on the total sum of the inverse numbers of the distances from the active computing apparatuses and the job allocation apparatus 20 selects a candidate inactive computing apparatus having the smallest equalization index. However, the embodiments are not limited to this. The job allocation apparatus 20 may select a candidate inactive computing apparatus farthest in any definition from the active computing apparatuses on the basis of distances from the active computing apparatuses to each inactive computing apparatus to allocate the next job to the selected candidate inactive computing apparatus.

(2) According to the fifth embodiment, the equalization index is obtained on the basis of the job allocation information, the position information, and the usage time. However, the equalization index may be obtained by further using the CPU usage rate in addition to the configuration of the fifth embodiment.

(3) According to the sixth embodiment, the equalization index is obtained on the basis of the job allocation information, the position information as well as the CPU usage rate. However, like the fifth embodiment, the equalization index may be obtained by taking into account the usage time and the load coefficient.

(4) For the environment where the large number of computing apparatuses are installed, the computer room 3 (FIGS. 1, 3A, and 3B) is exemplified, but the embodiments are not limited to this. The environment where the computing apparatuses are installed may be any space so long as the computing apparatuses are collectively installed, such as a factory or a laboratory other than the computer room.

(5) According to the above-mentioned embodiments, the CPU usage rate and the CPU usage rate table are used. Alternatively, the usage rate of a processor including a CPU and a management table for the usage rate of the processor may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A computing system comprising:
    a plurality of computing apparatuses;
    a job allocation information storage unit configured to store job allocation information indicating job allocation status of each of the plurality of computing apparatuses, the job allocation status being one of in an active state and in an inactive state;
    a position information storage unit configured to store position information indicating relative positions of the plurality of computing apparatuses; and
    a job allocation unit configured to:
        refer to the job allocation information and the position information,
        select a candidate inactive computing apparatus on the basis of a distance between each pair of an inactive computing apparatus and an active computing apparatus,
        allocate a job to the candidate inactive computing apparatus,
        calculate, for each inactive computing apparatus, a total sum of inverse numbers of distances from the respective active computing apparatuses, and
        determine an inactive computing apparatus having a smallest total sum as the candidate inactive computing apparatus.

2. The computing system according to claim 1, wherein the position information includes deployment information indicating deployment status of the plurality of computing apparatuses.

3. The computing system according to claim 1, further comprising:
    a usage time storage unit configured to store usage time information indicating usage time of each of the plurality of computing apparatuses,
    wherein the job allocation unit is further configured to:
        refer to the usage time information, and
        select the candidate inactive computing apparatus on the basis of the usage time information.

4. The computing system according to claim 1, further comprising:
    a usage time storage unit configured to store usage time information indicating usage time of each of the plurality of computing apparatuses,
    wherein the job allocation unit is further configured to:
        refer to the usage time information,
        calculate a load coefficient for each inactive computing apparatus on the basis of the usage time information, and
        select the candidate inactive computing apparatus on the basis of the load coefficient of each inactive computing apparatus.

5. The computing system according to claim 1, further comprising:
    a usage rate obtaining unit configured to obtain a usage rate of a processor in each inactive computing apparatus,
    wherein the job allocation unit is further configured to select the candidate inactive computing apparatus on the basis of the usage rate of the processor in each inactive computing apparatus.

6. A job allocation method executed by a job allocation apparatus, the job allocation method comprising:
    obtaining job allocation information indicating job allocation status of each of a plurality of computing apparatuses, the job allocation status being one of in an active state and in an inactive state;

obtaining position information indicating relative positions of the plurality of computing apparatuses;

selecting a candidate inactive computing apparatus on the basis of a distance between each pair of an inactive computing apparatus and an active computing apparatus;

allocating a job to the candidate inactive computing apparatus by the job allocation apparatus;

calculating, by the job allocation apparatus for each inactive computing apparatus, a total sum of inverse numbers of distances from the respective active computing apparatuses; and determining, by the job allocation apparatus, an inactive computing apparatus having a smallest total sum as the candidate inactive computing apparatus.

7. The job allocation method according to claim 6, further comprising:

obtaining usage time information indicating usage time of each of the plurality of computing apparatuses, wherein the job allocation apparatus selects the candidate inactive computing apparatus on the basis of the usage time information.

8. The job allocation method according to claim 6, further comprising:

obtaining usage time information indicating usage time of each of the plurality of computing apparatuses; and calculating a load coefficient for each inactive computing apparatus on the basis of the usage time information, wherein the job allocation apparatus selects the candidate inactive computing apparatus on the basis of the load coefficient of each inactive computing apparatus.

9. The job allocation method according to claim 6, further comprising:

obtaining a usage rate of a processor in each inactive computing apparatus, wherein the job allocation apparatus selects the candidate inactive computing apparatus on the basis of the usage rate of the processor in each inactive computing apparatus.

10. A computer readable, non-transitory recording medium storing a program that causes a computer to execute a job allocation method comprising:

obtaining job allocation information indicating job allocation status of each of a plurality of computing apparatuses, the job allocation status being one of in an active state and in an inactive state;

obtaining position information indicating relative positions of the plurality of computing apparatuses;

selecting a candidate inactive computing apparatus on the basis of a distance between each pair of an inactive computing apparatus and an active computing apparatus;

allocating a job to the candidate inactive computing apparatus;

calculating, for each inactive computing apparatus, a total sum of inverse numbers of distances from the respective active computing apparatuses; and determining an inactive computing apparatus having a smallest total sum as the candidate inactive computing apparatus.

11. The computer readable, non-transitory recording medium according to claim 10, the job allocation method further comprising:

obtaining usage time information indicating usage time of each of the plurality of computing apparatuses, wherein the computer selects the candidate inactive computing apparatus on the basis of the usage time information.

12. The computer readable, non-transitory recording medium according to claim 10, the job allocation method further comprising:

obtaining usage time information indicating usage time of each of the plurality of computing apparatuses; and calculating a load coefficient for each inactive computing apparatus on the basis of the usage time information, wherein the computer selects the candidate inactive computing apparatus on the basis of the load coefficient of each inactive computing apparatus.

13. The computer readable, non-transitory recording medium according to claim 10, the job allocation method further comprising:

obtaining a usage rate of a processor in each inactive computing apparatus, wherein the computer selects the candidate inactive computing apparatus on the basis of the usage rate of the processor in each inactive computing apparatus.

14. A job allocation apparatus comprising:

a processor configured to:

refer to job allocation information indicating job allocation status of each of a plurality of computing apparatuses, the job allocation status being one of in an active state and in an inactive state;

refer to position information indicating relative positions of the plurality of computing apparatuses;

select a candidate inactive computing apparatus on the basis of a distance between each pair of an inactive computing apparatus and an active computing apparatus;

allocate a job to the candidate inactive computing apparatus;

calculate, for each inactive computing apparatus, a total sum of inverse numbers of distances from the respective active computing apparatuses; and determine an inactive computing apparatus having a smallest total sum as the candidate inactive computing apparatus.

* * * * *